(12) United States Patent
Mountz et al.

(10) Patent No.: US 7,894,933 B2
(45) Date of Patent: Feb. 22, 2011

(54) METHOD AND SYSTEM FOR RETRIEVING INVENTORY ITEMS

(75) Inventors: Michael C. Mountz, Cambridge, MA (US); Peter R. Wurman, Raleigh, NC (US)

(73) Assignee: Kiva Systems, Inc., Woburn, MA (US)

( * ) Notice: Subject to any disclaimer, the term of this patent is extended or adjusted under 35 U.S.C. 154(b) by 981 days.

(21) Appl. No.: 11/185,957

(22) Filed: Jul. 19, 2005

(65) Prior Publication Data

US 2007/0021864 A1 Jan. 25, 2007

(51) Int. Cl.
*G06F 7/00* (2006.01)
*G06Q 10/00* (2006.01)

(52) U.S. Cl. .......................................... 700/214; 705/28

(58) Field of Classification Search .................. 700/213, 700/214
See application file for complete search history.

(56) References Cited

U.S. PATENT DOCUMENTS

| | | |
|---|---|---|
| 4,509,123 A | 4/1985 | Vereen |
| 4,542,808 A | 9/1985 | Lloyd, Jr. et al. |
| 4,669,047 A | 5/1987 | Chucta |
| 4,678,390 A | 7/1987 | Bonneton et al. |
| 4,716,530 A | 12/1987 | Ogawa et al. |
| 4,780,817 A | 10/1988 | Lofgren |
| 4,789,940 A | 12/1988 | Christian |
| 4,996,468 A | 2/1991 | Field et al. |
| 5,179,329 A | 1/1993 | Nishikawa et al. |
| 5,187,664 A | 2/1993 | Yardley et al. |
| 5,228,820 A | 7/1993 | Stansfield et al. |
| 5,283,739 A | 2/1994 | Summerville et al. |
| 5,362,197 A | 11/1994 | Rigling |
| 5,395,199 A | 3/1995 | Day, III et al. |
| 5,434,490 A | 7/1995 | Ishida et al. |
| 5,568,030 A | 10/1996 | Nishikawa et al. |
| 5,646,389 A | 7/1997 | Bravman et al. |
| 5,652,489 A | 7/1997 | Kawakami |
| 5,663,879 A | 9/1997 | Trovato et al. |
| 5,793,934 A | 8/1998 | Bauer |
| 5,800,777 A | 9/1998 | Jehan |
| 5,801,506 A | 9/1998 | Netzler |
| 5,819,008 A | 10/1998 | Asama et al. |
| 5,825,149 A | 10/1998 | Matsumoto et al. |
| 5,825,981 A | 10/1998 | Matsuda |
| 5,928,952 A | 7/1999 | Hutchins et al. |

(Continued)

OTHER PUBLICATIONS

U.S. Appl. No. 11/185,198, entitled "Method and System for Replenishing Inventory Items," filed Jul. 19, 2005, 65 pages.

(Continued)

*Primary Examiner* — Gene Crawford
*Assistant Examiner* — Ramya Prakasam
(74) *Attorney, Agent, or Firm* — Baker Botts L.L.P.

(57) ABSTRACT

A method for retrieving inventory items within an inventory system includes receiving a retrieval request that identifies an inventory item and selecting, from a plurality of inventory stations, an inventory station to fulfill an order associated with the retrieval request. The method also includes selecting an inventory holder from a plurality of inventory holders that store the inventory item and selecting, from a plurality of mobile drive units, a mobile drive unit to move the selected inventory holder to the selected inventory station.

49 Claims, 6 Drawing Sheets

U.S. PATENT DOCUMENTS

| | | | |
|---|---|---|---|
| 5,933,394 | A | 8/1999 | Kim |
| 6,049,745 | A | 4/2000 | Douglas et al. |
| 6,061,607 | A | 5/2000 | Bradley et al. |
| 6,148,291 | A | 11/2000 | Radican |
| 6,164,537 | A | 12/2000 | Mariani et al. |
| 6,208,908 | B1 | 3/2001 | Boyd et al. |
| 6,317,648 | B1 | 11/2001 | Sleep et al. |
| 6,339,764 | B1 | 1/2002 | Livesay et al. |
| 6,351,685 | B1 | 2/2002 | Dimitri et al. |
| 6,356,838 | B1 | 3/2002 | Paul |
| 6,421,579 | B1 | 7/2002 | Dimitri et al. |
| 6,463,360 | B1 | 10/2002 | Terada et al. |
| 6,463,460 | B1 | 10/2002 | Simonoff |
| 6,549,891 | B1 | 4/2003 | Rauber et al. |
| 6,622,127 | B1 * | 9/2003 | Klots et al. .......... 705/28 |
| 6,748,292 | B2 | 6/2004 | Mountz |
| 6,895,301 | B2 | 5/2005 | Mountz |
| 6,950,722 | B2 | 9/2005 | Mountz |
| 2002/0026347 | A1 | 2/2002 | Yanagino et al. |
| 2002/0035524 | A1 | 3/2002 | Husslage |
| 2002/0063225 | A1 | 5/2002 | Payton |
| 2002/0188499 | A1 | 12/2002 | Jenkins et al. |
| 2003/0001725 | A1 | 1/2003 | Moore |
| 2003/0110104 | A1 | 6/2003 | King et al. |
| 2004/0002905 | A1 | 1/2004 | Oya |
| 2004/0034581 | A1 | 2/2004 | Hill et al. |
| 2005/0102203 | A1 | 5/2005 | Keong |
| 2005/0108114 | A1 | 5/2005 | Kaled |
| 2005/0261975 | A1 | 11/2005 | Carver |
| 2006/0036498 | A1 | 2/2006 | Iida et al. |
| 2006/0190276 | A1 | 8/2006 | Williamson |
| 2007/0017984 | A1 | 1/2007 | Mountz et al. |
| 2007/0021863 | A1 | 1/2007 | Mountz et al. |
| 2007/0023193 | A1 | 2/2007 | King |
| 2007/0162360 | A1 * | 7/2007 | Congram et al. .......... 705/28 |
| 2007/0228068 | A1 | 10/2007 | Schneider et al. |
| 2008/0167884 | A1 | 7/2008 | Mountz et al. |
| 2009/0185884 | A1 | 7/2009 | Wurman et al. |

OTHER PUBLICATIONS

U.S. Appl. No. 11/185,467, entitled "Method and System for Storing Inventory Items," filed Jul. 19, 2005, 63 pages.

European Patent Office Communication enclosing an extended European Search Report which includes the supplementary European Search Report and the European Search Opinion; Application No. 06787457.8-1238 / 1920396 PCT/US2006027552; 8 pages, Apr. 27, 2010.

PCT Notification of Transmittal of the International Search Report and the Written Opinion of the International Searching Authority, or the Declaration with attached PCT Written Opinion of the International Searching Authority, International Application No. PCT/US 06/27552, Jul. 7, 2008.

PCT Notification of Transmittal of the International Search Report and the Written Opinion of the International Searching Authority, or the Declaration mailed Jul. 15, 2010, regarding PCT/US10/24965 filed Feb. 23, 2010.

Noah Schachtman, "A War of Robots, All Chattering on the Western Front," http://nytimes.com/2002/07/11/technology/circuits/ 11NEST.html, Dated Jul. 11, 2002 Downloaded Aug. 21, 2002.

Steven Johnson, "Emergence-The Connected Lives of Ants, Brains, Cities, and Software;" Part Two "Street Level," NY, NY, pp. 73-100, plus cover and Table of Contents, 2001.

Kevin Kelly, "New Rules for the New Economy-10 Radical Strategies for a Connected World," Chapter 2 "Embrace the Swarm," NY, NY, pp. 1-22, plus cover and Table of Contents, 1998.

David Payton, "Pheromone Robotics;" Presentation given to the Defense Advance Research Project Agency in Nashville, TN, Jul. 17, 2001.

David Payton, et al., "Progess in Pheromone Robotics", 7th International Conference on Intelligent Autonomous Systems; Mar. 25-27, 2002, Marina del Rey, CA, HLR Laboratories, 2001.

David Payton, et al., "Autonomy-Oriented Computation in Pheromone Robotics," Working Notes of the First International Workshop on Autonomy Oriented Computation (AOC-01), pp. 69-77, May 28-Jun. 1, 2001, Montreal, Canada, 2001.

David Payton, et al., "Pheromone Robotics,", Autonomous Robots, vol. 11, No. 3, Kluwer Academic Publishers, Norwell, MA., pp. 319-329, Nov. 2001.

USPTO Office Action, U.S. Appl. No. 11/185,198, Filing date Jul. 10, 2005, inventors Mountz et al., dated May 30, 2008.

USPTO Office Action, U.S. Appl. No. 11/185,198, Filing date Jul. 10, 2005, inventors Mountz et al., dated Dec. 23, 2008.

USPTO Final Office Action, U.S. Appl. No. 11/185,198, Filing date Jul. 10, 2005, inventors Mountz et al., dated Jun. 11, 2009.

USPTO Notice of Allowability, U.S. Appl. No. 11/185,198, Filing date Jul. 10, 2005, inventors Mountz et al., dated Jan. 28, 2010.

USPTO Office Action, U.S. Appl. No. 11/185,467, Filing date Jul. 19, 2005, inventors Mountz et al., dated Jun. 26, 2008.

USPTO Office Action, U.S. Appl. No. 11/185,467, Filing date Jul. 19, 2005, inventors Mountz et al., dated Dec. 31, 2008.

USPTO Final Office Action, U.S. Appl. No. 11/185,467, Filing date Jul. 19, 2005, inventors Mountz et al., dated Jun. 25, 2009.

USPTO Office Action, U.S. Appl. No. 11/185,467, Filing date Jul. 19, 2005, inventors Mountz et al., dated Feb. 5, 2010.

USPTO Final Office Action, U.S. Appl. No. 11/185,467, Filing date Jul. 19, 2005, inventors Mountz et al., dated Jul. 27, 2010.

* cited by examiner

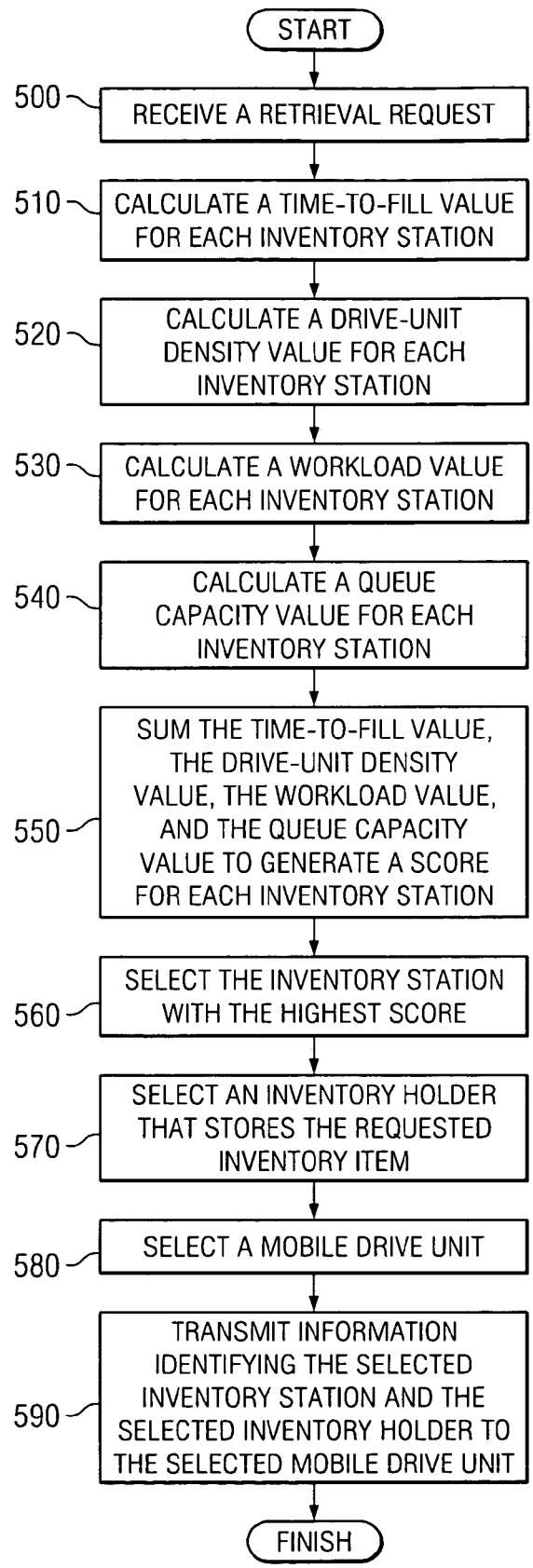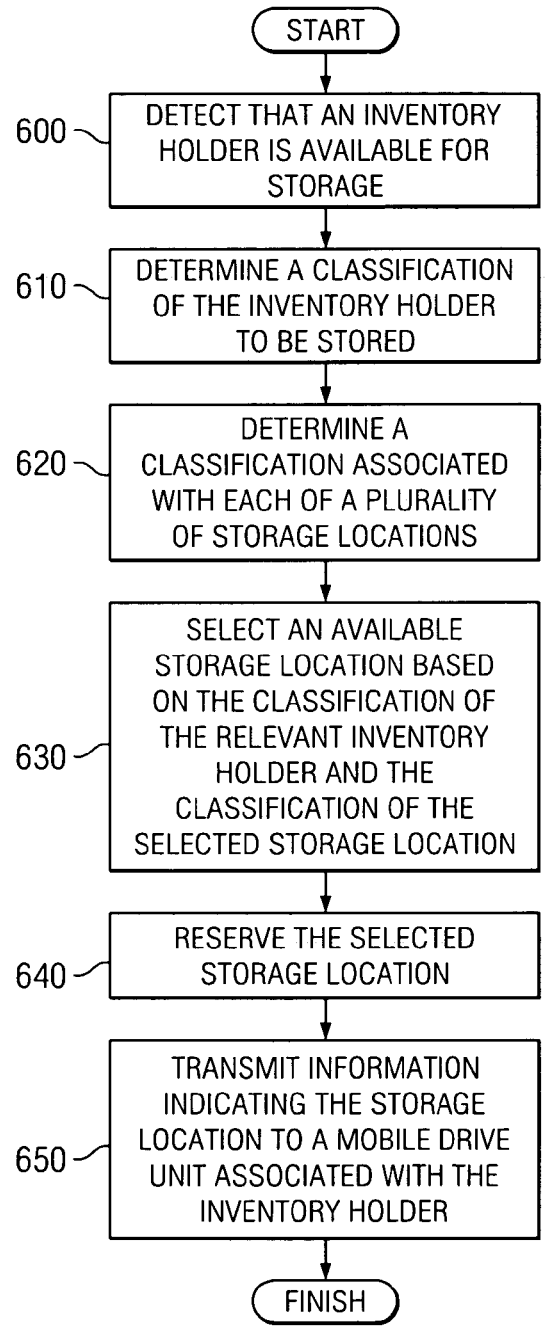

METHOD AND SYSTEM FOR RETRIEVING INVENTORY ITEMS

TECHNICAL FIELD OF THE INVENTION

This invention relates in general to inventory systems, and more particularly to a method and system for efficient storage and retrieval of inventory items.

BACKGROUND OF THE INVENTION

Modern inventory systems, such as those in mail-order warehouses, airport luggage systems, and custom-order manufacturing facilities, face significant challenges in responding to requests for inventory items. In inventory systems tasked with responding to large numbers of diverse inventory requests, slow responses to inventory requests may result in an ever-increasing backlog of inventory requests. Furthermore, in inventory systems encompassing substantial amounts of physical space, response times for inventory requests may depend heavily on the storage spaces of the requested inventory items within the inventory system.

SUMMARY OF THE INVENTION

In accordance with the present invention, the disadvantages and problems associated inventory storage have been substantially reduced or eliminated. In particular, a mobile inventory system is provided that includes one or more mobile drive units capable of moving any of a plurality of inventory holders between locations within a physical space associated with the mobile inventory system.

In accordance with one embodiment of the present invention, a method for retrieving inventory items within an inventory system includes receiving a retrieval request that identifies an inventory item and selecting, from a plurality of inventory stations, an inventory station to fulfill an order associated with the retrieval request. The method also includes selecting an inventory holder from a plurality of inventory holders that store the inventory item and selecting, from a plurality of mobile drive units, a mobile drive unit to move the selected inventory holder to the selected inventory station.

In accordance with another embodiment of the present invention, a system for storing inventory items, comprises a plurality of inventory holders, a plurality of mobile drive units, a plurality of inventory stations, and a management module. The plurality of inventory holders are capable of storing inventory items and the plurality of mobile drive units are capable of moving the inventory holders. The plurality of inventory stations represent locations where inventory items may be removed from inventory holders and/or equipment for removing inventory items from inventory holders. Additionally, the management module is capable of receiving a retrieval request that identifies an inventory item and selecting, from the plurality of inventory stations, an inventory station to fulfill an order associated with the retrieval request. The management module is further capable of selecting an inventory holder from the plurality of inventory holders that store the inventory item and selecting, from the plurality of mobile drive units, a mobile drive unit to move the selected inventory holder to the selected inventory station.

Technical advantages of certain embodiments of the present invention include the ability to optimize, with respect to task completion times, work distribution, and other relevant metrics, the selection of system components to perform inventory-related tasks. Other technical advantages of certain embodiments of the present invention include providing a flexible and scalable inventory storage solution that can be easily adapted to accommodate system growth and modification.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 5 is a flowchart illustrating operation of a particular embodiment of the inventory system while retrieving the inventory holder;

FIG. 6 is a flowchart illustrating operation of a particular embodiment of the inventory system while storing the inventory holder.

DETAILED DESCRIPTION OF THE INVENTION

Figure 1:
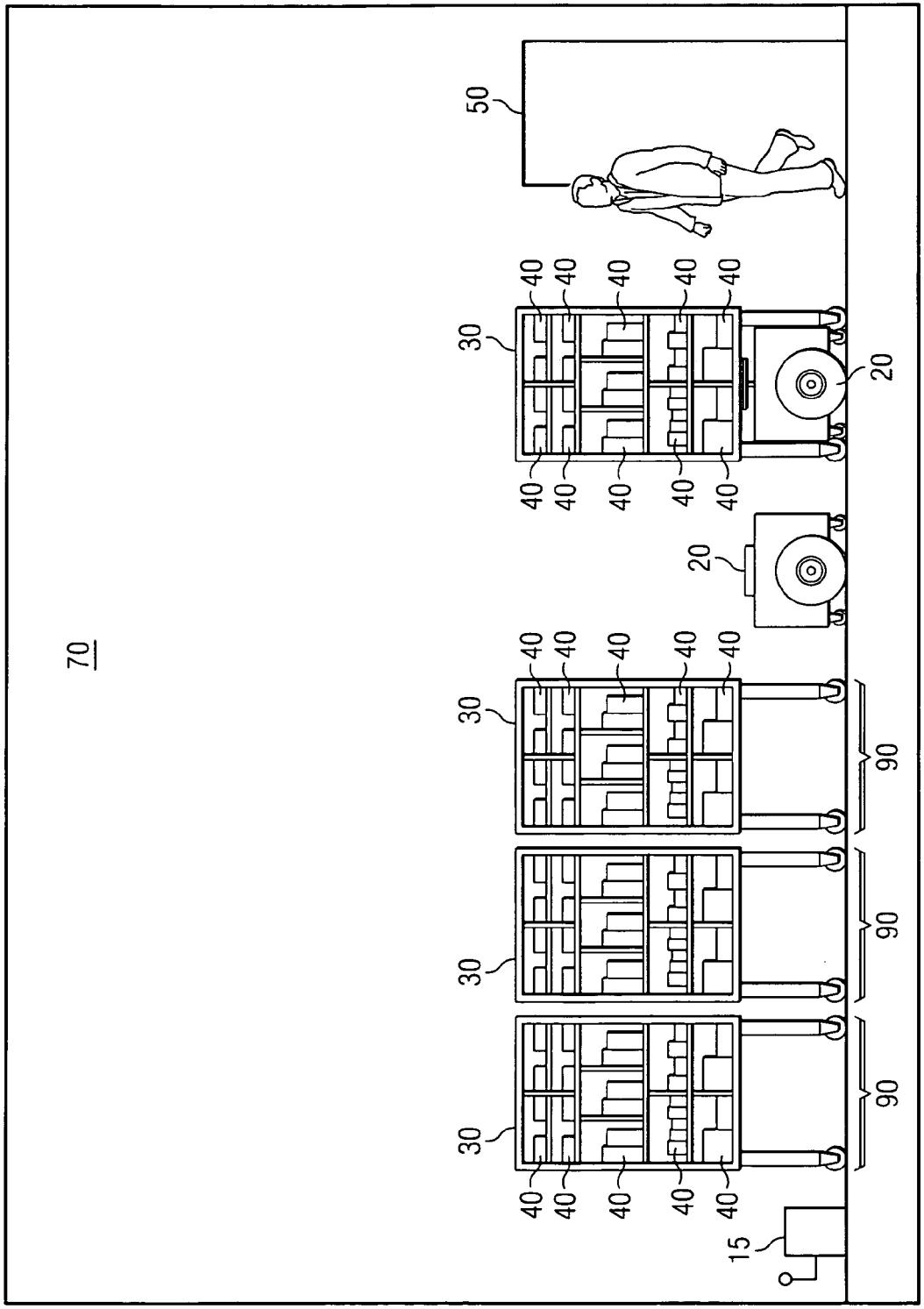
FIG. 1 illustrates components of an inventory system according to a particular embodiment.

FIG. 1 illustrates the contents of an inventory system 10. Inventory system 10 includes a management module 15, one or more mobile drive units 20, one or more inventory holders 30, and one or more inventory stations 50. Mobile drive units 20 transport inventory holders 30 between storage spaces 90 and/or inventory stations 50 within a workspace 70 in response to commands communicated by management module 15. Each inventory holder 30 stores one or more types of inventory items 40. As a result, inventory system 10 is capable of moving inventory items 40 between storage spaces and inventory stations 50 in order to facilitate the input and removal of inventory items 40 from inventory system 10 and the completion of other tasks involving inventory items 40.

Management module 15 receives and/or generates inventory requests that initiate particular operations involving inventory items 40 and transmits these inventory requests to appropriate components of inventory system 10. These inventory requests specify operations to be performed by inventory system 10 and/or inventory items 40 that are associated with these operations. Management module 15 may select components of inventory system 10 to perform these operations and communicate appropriate commands and/or data to the selected components to facilitate completion of these operations. Although the description below focuses on embodiments of inventory system 10 that receive inventory requests from other components of inventory system 10, management module 15 may alternatively or additionally generate inventory requests itself using any appropriate techniques. In such embodiments, management module 15 may generate inventory requests based on a predetermined schedule of operations, in response to detecting the occurrence of a particular event, or at any appropriate time.

Additionally, management module 15 may represent a single component, multiple components located at a central location within inventory system 10, and/or multiple components distributed throughout inventory system 10. For example, management module 15 may represent components of one or more mobile drive units 20 that are capable of communicating information between the mobile drive units 20 and coordinating movement of mobile drive units 20 in transporting inventory holders 30. In general, management module 15 may include any appropriate combination of hardware and/or software suitable to provide the described functionality and may further include components located on mobile drive units 20, inventory stations 50, or other elements of inventory system 10.

Mobile drive units 20 move inventory holders 30 between locations within a workspace 70 associated with inventory system 10. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. In alternative embodiments, mobile drive units 20 represent elements of a tracked inventory system 10 configured to move inventory holder 30 along tracks, rails, cables, or other guidance elements traversing workspace 70. In such an embodiment, mobile drive units 20 may receive power through a connection to the guidance elements, such as a powered rail.

Additionally, mobile drive units 20 may be capable of communicating with management module 15 to receive information identifying selected inventory holders 30, transmit locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or any other appropriate wireless communication protocol. As another example, in a tracked inventory system 10, tracks or other guidance element upon which mobile drive units 20 move may be wired to facilitate communication between mobile drive units 20 and other components of inventory system 10.

Furthermore, as noted above, management module 15 may include components of individual mobile drive units 20. Thus, for the purposes of this description, communication between management module 15 and a particular mobile drive unit 20 may represent communication between components of a particular mobile drive unit 20. In general, mobile drive units 20 may be powered, controlled, and propelled in any manner appropriate based on the configuration and characteristics of inventory system 10.

Inventory holders 30 store inventory items 40. In a particular embodiment, inventory holders 30 include multiple storage bins with each storage bin capable of holding a different type of inventory item 40. Inventory holders 30 are capable of being rolled or otherwise moved by mobile drive units 20. In particular embodiments, inventory holder 30 may provide additional propulsion to supplement that provided by mobile drive unit 20 when moving inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items 40 represent any objects suitable for storage and retrieval in an automated inventory system 10. For the purposes of this description, "inventory item 40" may represent any one or more objects of a particular type that are stored in inventory system 10, while a "unit" of an inventory item 40 represents an individual object of that type. For example, in an inventory system 10 that stores books, a particular book title may represent an "inventory item 40" while each individual copy of that book may represent a "unit" of the inventory item 40. Thus, a particular inventory holder 30 is currently "storing" a particular inventory item 40 if the inventory holder 30 currently holds one or more units of that type. Similarly, two units of inventory may represent the "same" inventory item 40 if the units are of the same type.

As noted, inventory items 40 may represent any objects suitable for storage in inventory system 10. As one example, inventory system 10 may represent a mail order warehouse facility, and inventory items 40 may represent merchandise stored in the warehouse facility. Mobile drive unit 20 may retrieve a particular inventory holder 30 containing one or more inventory items 40 requested in an order to be packed for delivery to a customer.

As another example, inventory system 10 may represent an airport luggage facility. In such an embodiment, inventory items 40 may represent pieces of luggage stored in the luggage facility. Mobile drive unit 20 may retrieve inventory holder 30 containing luggage arriving and/or departing on particular flights or luggage destined for particular types of processing, such as x-ray or manual searching.

As another example, inventory system 10 may represent a merchandise-return facility. In such an embodiment, inventory items 40 may represent merchandise returned by customers. Units of these inventory items 40 may be stored in inventory holders 30 when received at the facility. At appropriate times, a large number of units may be removed from a particular inventory holder 30 and packed for shipment back to a warehouse or other facility. For example, individual units of a particular inventory item 40 may be received and stored in inventory holders 30 until a threshold number of units of that inventory item 40 have been received. A pallet may then be packed with inventory item 40 and shipped to another facility, such as a mail-order warehouse.

As yet another example, inventory system 10 may represent a manufacturing facility, and inventory items 40 may represent individual components of a manufacturing kit. More specifically, these components may represent components intended for inclusion in an assembled product, such as electronic components for a customized computer system. In such an embodiment, inventory system 10 may retrieve particular components identified by a specification associated with an order for the product so that a customized version of the product can be built . . . . Although a number of example embodiments are described, inventory system 10 may, in general, represent any suitable facility or system for storing and processing inventory items 40, and inventory items 40 may represent objects of any type suitable for storage in a particular inventory system 10.

Inventory stations 50 represent locations designated for the removal of inventory items 40 from inventory holders 30, the introduction of inventory items 40 into inventory holders 30, the counting of inventory items 40 in inventory holders 30, and/or the processing or handling of inventory items 40 in any other suitable manner. Inventory stations 50 may also represent any appropriate components for processing or handling inventory items 40, such as scanners for monitoring the flow of inventory items 40 in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items 40, such as packing or counting inventory items 40, as part of the operation of inventory system 10.

Although "inventory station" as used in the following description refers to locations at which any appropriate processing operation supported by inventory system 10 may be completed, particular embodiments of inventory system 10 may include specialized inventory stations 50 suitable for performing only a single processing task supported by inventory system 10. For example, a particular inventory station 50 may be capable of handling only retrieval requests or only replenishment requests, as defined below. Moreover, a particular embodiment of inventory system 10 may include inventory stations 50 that are, in general, capable of handling multiple types of inventory requests but, at any given time, configured to handle only one particular type of inventory requests.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 1 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or arbitrary geometry.

During operation of a particular embodiment of inventory system 10, management module 15 receives inventory requests that trigger particular operations within inventory system 10 including, but not limited to, operations associated with the retrieval, storage, replenishment, and counting of inventory items 40 and/or inventory holders 30. Inventory requests may represent communication of any form suitable for inventory system 10 and may include any appropriate information identifying inventory items 40 and/or operations to be completed by inventory system 10. Furthermore, although the description below focuses on an embodiment of inventory system 10 capable of performing particular operations, a particular embodiment of inventory system 10 may be configured to perform any appropriate operation associated with the storage, processing, or removal of inventory items 40.

As noted above, management module 15 may receive inventory requests from a human operator or other components of inventory system 10. For example, an operator of inventory system 10 may manually enter inventory requests using a keyboard coupled to management module 15. As another example, management module 15 may receive inventory requests from remote components over a network connection, such as an internet connection. Alternatively, management module 15 may itself generate inventory requests. For example, management module 15 may be configured to initiate a particular operation based on a predetermined schedule or in response to a particular event, and may generate inventory requests accordingly. In general, management module 15 may receive or generate inventory requests in any suitable manner. For the sake of illustration, however, the description below assumes that management module 15 receives inventory requests from other elements of inventory system 10.

In response to receiving an inventory request, management module 15 may select components or other elements of inventory system 10 to complete the inventory request. For example, depending on the type of operation requested, management module 15 may select a particular mobile drive unit 20, inventory holder 30, inventory station 50, storage space 90, and/or other suitable components and elements of inventory system to facilitate completion of the inventory request. After management module 15 selects suitable components and/or elements to complete the inventory request, management module 15 may then communicate information identifying one or more of the selected components and/or elements to one or more component of inventory system 10. This information may identify the selected components or elements using some identifier, such as a name or number associated with the selected components, or using the location of the selected components.

For example, in retrieving inventory items 40 in a particular embodiment of inventory system 10, management module 15 selects a mobile drive unit 20, inventory holder 30, and an inventory station 50 to complete the operation. After selecting these components, management module 15 may communicate information identifying the selected inventory holder 30 and the selected inventory station 50 to the selected mobile drive unit 20. Management module 15 may identify inventory holder 30 to a selected mobile drive unit 20 by specifying the selected inventory holder 30, by identifying a location for the selected inventory holder 30, or in any other suitable manner. Management module 15 may also transmit information specifying the selected inventory holder 30 and one or more inventory items 40 associated with the inventory request to the selected inventory station 50 to identify inventory items 40 to be selected in fulfilling the inventory request.

Figure 2:
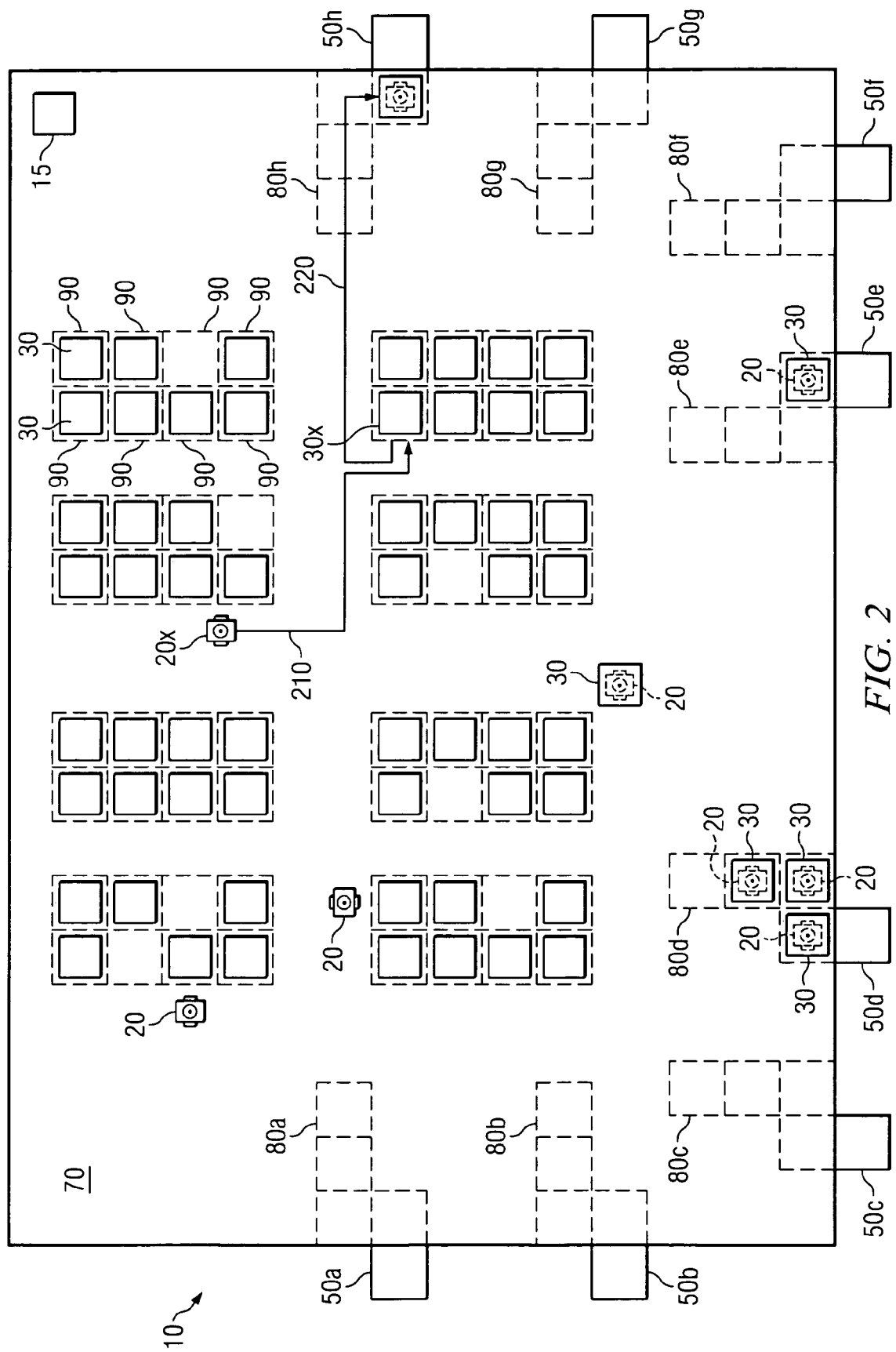
FIG. 2 illustrates operation of a particular embodiment of the inventory system while retrieving an inventory holder containing particular inventory items.
Figure 3:
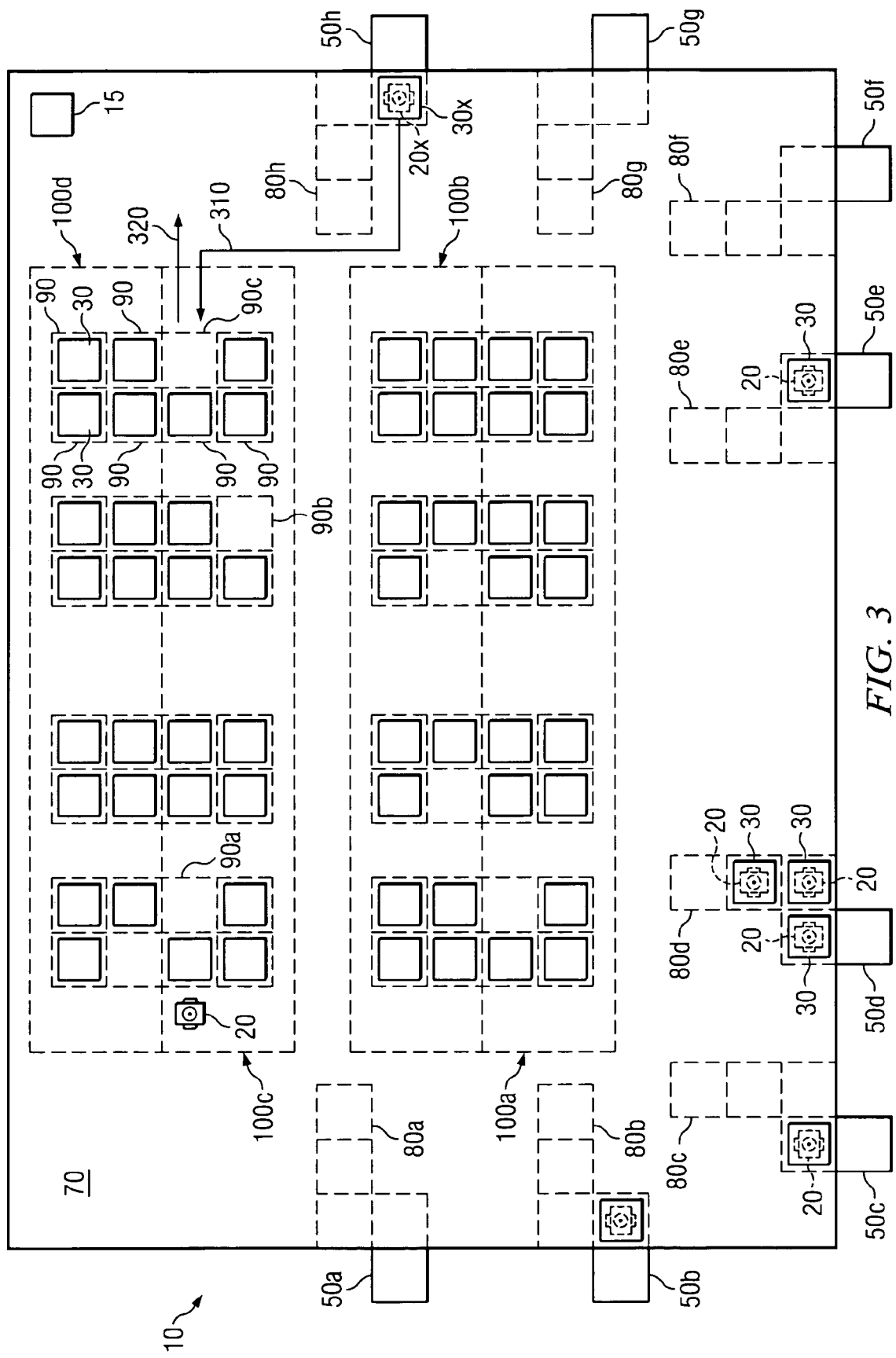
FIG. 3 illustrates operation of a particular embodiment of the inventory system while storing the inventory holder.
Figure 4:
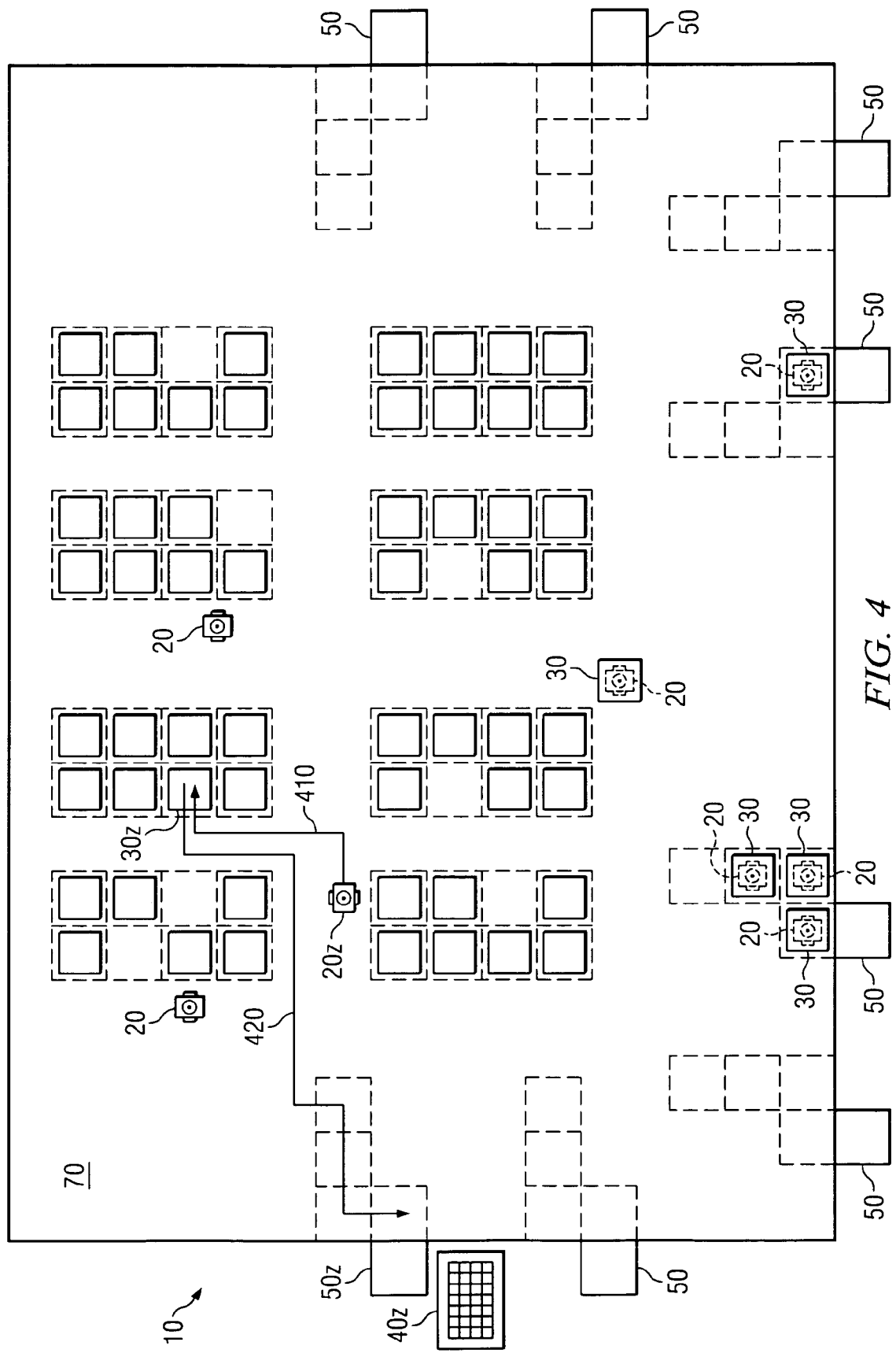
FIG. 4 illustrates operation of a particular embodiment of the inventory system while replenishing the inventory holder.

The selected components may then utilize the received information to complete the inventory request in an appropriate manner. For example, a selected mobile drive unit 20 may move a selected inventory holder 30 to a selected inventory station 50 so that an operator of the selected inventory station 50 may pick requested inventory items 40 from the selected inventory holder 30 and pack them for shipment. FIGS. 2-4 illustrate further the operation of a particular embodiment of inventory system 10 in responding to particular types of inventory requests.

FIGS. 2 and 3 illustrate the operation of a particular embodiment of inventory system 10 in responding to a particular type of inventory request, referred to here as a "retrieval request," which identifies one or more types of inventory items 40 to be retrieved from storage in inventory system 10. In the embodiment of inventory system 10 illustrated by FIGS. 2 and 3, inventory system 10 utilizes a two-step process to respond to retrieval requests. More specifically, inventory system 10 first retrieves a selected inventory holder 30 from a storage space 90 and moves the selected inventory holder 30 to a selected inventory station 50. After the appropriate inventory items 40 have been picked from inventory holder 30, inventory system 10 determines an appropriate storage space 90 for the selected inventory holder 30 and moves inventory holder 30 to the storage space 90, moves the inventory holder 30 in such a way as to present another face to inventory station 50, or moves inventory holder 30 to another inventory station 50. FIG. 2 illustrates operation of inventory system 10 in selecting and retrieving inventory holder 30, while FIG. 3 illustrates operation of inventory system 10 in storing the selected inventory holder 30. Although the description below describes inventory system 10 as performing a retrieval step and a storage step when responding to retrieval requests, inventory system 10 may, in a particular embodiment, be configured to perform either of the retrieval step or the store step independently of the other or to include any appropriate additional steps when responding to retrieval requests.

FIG. 2, as noted above, illustrates operation of inventory system 10 in retrieving an inventory holder 30 from storage within workspace 70. FIG. 2 shows a top view of inventory system 10 that includes mobile drive units 20, inventory holders 30, and inventory stations 50. Furthermore, workspace 70 also includes multiple storage spaces 90 which represent physical locations where inventory holders 30 rest when not being used to respond to inventory requests.

Additionally, in the illustrated embodiment, each inventory station 50 has a queue associated with that inventory station 50 located adjacent to or near the inventory station 50. Each queue 80 provides space for one or more mobile drive units 20 and/or inventory holders 30 to rest until the associated inventory station 50 is ready to process a request associated with that mobile drive unit 20 or inventory holder 30. For example, a particular inventory station 50 may be involved with processing several inventory requests simultaneously, and several mobile drive units 20 may arrive at that inventory station 50 at approximately the same time. While the operator of that inventory station 50 processes inventory items 40 of one inventory holder 30 based on an inventory request associated with that inventory holder 30, mobile drive units 20 and/or inventory holders 30 associated with other inventory requests may wait in queue 80 until the operator of the inventory station 50 has finished processing the first inventory request.

In operation, management module 15 receives a retrieval request that identifies one or more types of inventory items 40 to be retrieved from storage in inventory system 10. Depending on the configuration of inventory system 10, the retrieval request may identify types of inventory items 40 to be retrieved, for example by specifying a product name, or specific inventory items 40, for example by identifying particular articles of luggage. In response to receiving the retrieval request, management module 15 selects one of inventory stations 50 at which the retrieval request will be processed using suitable criteria. For the purposes of this description, "processing" a retrieval request may include selecting designated inventory items 40 from inventory holders 30 and placing these inventory items 40 in a box for shipping, assembling a finished product from the designated inventory items 40, counting the number of the specified inventory items 40 in the inventory holder 30, or processing the designated inventory items 40 in any other appropriate manner based on the characteristics of inventory system 10.

Management module 15 also selects one or more inventory holders 30 that contain the identified inventory items 40 and one or more mobile drive units 20 to move the selected inventory holders 30 to the selected inventory station 50. Although the description below focuses, for purposes of illustration, on an embodiment of inventory system 10 that selects inventory station 50, inventory holder 30, and mobile drive unit 20 in a particular order based on particular criteria, management module 15 may select these components in any suitable order and may utilize any suitable factors, criteria, or considerations in determining which components to use as described in greater detail below. Furthermore, management module 15 may select each component independently or may base the selection of a particular component on the selection of any other component.

As noted above, management module 15 may utilize any suitable factors, criteria, or considerations in determining which components of inventory system 10 to use in fulfilling the retrieval request. The criteria utilized by management module 15 in selecting an inventory station 50 may include, but is not limited to, the distance between the selected inventory station 50 and particular inventory holders 30 or mobile drive units 20, the work history of the selected inventory station 50, the worker or station capabilities at station 50, and the current contents of queue 80 associated with the selected inventory station 50. For example, in a particular embodiment of inventory system 10, management module 15 calculates a score for each inventory station 50 with respect to the requested inventory item 40. This score is a function of several factors including a product density value, a drive unit density value, a workload value, and a queue capacity value, as described below. Management module 15 may then select an inventory station 50 based on the score of the selected inventory station 50.

The product density value of a particular inventory station 50, in this example embodiment, measures the distribution of the requested inventory item 40 relative to that inventory station 50. As one example, management module 15 calculates the product density value of the relevant inventory station 50 based on the distance between the inventory station 50 and one or more inventory holders 30 currently storing inventory items 40 of the relevant item type. More specifically, management module 15 calculates the product density value based on both the number of inventory holders 30 near inventory station 50 that hold the requested inventory item 40 and on the inverse of the distance to these inventory holders 30. By selecting an inventory station 50 that is close to several inventory holders 30 with the requested inventory item 40, management module 15 may be able to optimize operation of inventory system 10.

In selecting a mobile drive unit 20 and/or inventory holder 30, management module 15 may also consider the fact that a particular inventory holder 30 is already en route to the selected inventory station 50 to fulfill another retrieval request, or that the selected inventory station 50 is located on or near a path to be traveled by a particular inventory holder 30 in fulfilling another retrieval request. Thus, management module 15 may be able to utilize mobile drive units 20 that are already in the process of completing retrieval requests and, as a result, further optimize use of system resources and/or minimize the amount of time taken to fulfill the current retrieval request. Depending on the configuration of inventory system 10, management module 15 may use this information in any appropriate manner. For example, management module 15 may set the product density value to some predetermined maximum value if an inventory holder 30 storing an inventory item 40 of the relevant item type is already en route to that inventory station 50 (or automatically choose the inventory holder).

The drive unit density value of a particular inventory station 50, in this example embodiment, describes the distribution of mobile drive units 20 relative to that inventory station 50. Management module 15 may calculate the drive unit density value based on the distance between the inventory station 50 and one or more mobile drive units 20 available to respond to the retrieval request. More specifically, management module 15 may calculate the drive unit value based on both the number of available mobile drive units 20 near inventory station 50 and the inverse of the distance between each of these mobile drive units 20 and the inventory station 50. By selecting an inventory station 50 that is close to several free mobile drive units 20, management module 15 may be able to further optimize operation of inventory system 10.

The workload value of a particular inventory station 50, in the example embodiment, represents a measure of the work performed by the current operator of that inventory station 50. For example, management module 15 may calculate the workload value based on the number of inventory requests fulfilled by the operator of that inventory station 50 over a predetermined period of time, the amount of time the operator has spent working on retrieval requests, or any other appropriate measure of the work history of the operator. Alternatively, the workload value may measure the work history of that inventory station 50 for all operators. For example, management module 15 may calculate the workload value based on a number of inventory requests completed at that inventory station 50 by any operator. By considering this workload value, management module 15 may be capable of providing a more even distribution of tasks between the various inventory stations 50 and/or operators active in inventory system 10.

The queue capacity value of a particular inventory station 50, in this example embodiment, describes the contents of queue 80 associated with that inventory station 50. Management module 15 may determine the queue capacity value of a particular inventory station 50 based on a number of open slots in queue 80 associated with the inventory station 50, a number of inventory holders 30 currently waiting in queue 80, an anticipated wait time for inventory holders 30 entering queue 80, or any other suitable measure or value associated with the contents of queue 80. In the example embodiment, management module 15 calculates a queue capacity value for each inventory station 50 that is the inverse of the number of open queue spots associated with that inventory station 50. Management module 15 may be further configured to prefer inventory stations 50 with a greater number of open queue spaces, eliminate inventory stations 50 from consideration that have no empty queue spaces, or use the information provided by the queue capacity value in any appropriate manner. As a result, management module 15 may be able to optimize operation of inventory system 10 by limiting the amount of time mobile drive units 20 and inventory holders 30 wait in queues 80.

As indicated above, management module 15 may then use the relevant factors in any suitable manner to select the inventory station 50, giving any appropriate weight or consideration to each factor. In the example embodiment, management module 15 calculates a score for each inventory station 50 based on a weighted sum of the product density value, the mobile drive unit density value, the workload value, and the queue capacity value with an appropriate weight assigned to each value. Management module 15 then selects the inventory station 50 with the lowest score to process the retrieval request. For the purposes of this example, management module 15 is assumed to have selected a particular inventory station 50, shown as selected inventory station 50h in FIG. 2.

In addition to selecting an inventory station 50, management module 15 selects an inventory holder 30 and a mobile drive unit 20 to facilitate completion of the retrieval request. As with selecting inventory station 50, management module 15 may use any appropriate criteria, factors, or considerations in selecting inventory holder 30 and mobile drive unit 20. In selecting inventory holder 30, the criteria utilized by management module 15 may include, but is not limited to, the distance between the selected inventory holder 30 and one or more mobile drive units 20 or inventory stations 50, the contents of the selected inventory holder 30, the relative placement of inventory items 40 in the selected inventory holder 30, and the current commitments of the selected inventory holder 30. In selecting mobile drive unit 20, the criteria utilized by management module 15 may include, but is not limited to, the distance between the selected mobile drive unit 20 and one or more inventory holders 30 or inventory stations 50 and the current availability of the selected mobile drive unit 20.

For example, in a particular embodiment, management module 15 selects inventory holder 30 by first determining which inventory holders 30 currently store the requested inventory item 40. Management module 15 may then select from the inventory holders 30 that are currently holding the requested inventory item 40 an inventory holder 30 based on additional criteria. More specifically, in a particular embodiment, management module 15 calculates a score for each inventory holder 30 that stores the requested inventory item 40. This score is based, in part, on the inverse of the distance from the inventory holder 30 to the selected inventory station 50. In this embodiment, management module 15 then selects the inventory holder 30 with the highest score. For the purposes of example, management module 15 is assumed to have selected a particular inventory holder 30, shown as selected inventory holder 30x in FIG. 2.

Additionally, a particular embodiment of inventory system 10 may be configured to utilize retrieval requests identifying a plurality of inventory items 40. In such an embodiment, management module 15 may select an inventory holder 30 based on the number of inventory items 40 identified by the retrieval request that are currently stored in that inventory holder 30. For example, management module 15 may select the inventory holder 30 holding the greatest number of requested inventory items 40. Alternatively, inventory holder 30 may identify a group of inventory holders 30 holding a minimum number of the requested inventory items 40 and select a particular inventory holder 30 from that group based on additional criteria.

Moreover, a particular embodiment of inventory system 10 may also be configured to utilize retrieval requests identifying a quantity of a particular inventory item 40 to be retrieved. In such an embodiment, management module 15 may select an inventory holder 30 based on the number of units of the requested inventory item 40 stored on that inventory holder 30. For example, management module 15 may identify a group of inventory holders 30 currently holding a quantity of the requested inventory item 40 that is greater than the requested quantity of the inventory item 40 specified in the retrieval request. Management module 15 may then select a particular inventory holder 30 from this group based on additional criteria.

Furthermore, inventory holders 30 may include a plurality of faces, and each inventory item 40 stored in a particular inventory holder 30 may be associated with one or more faces of that inventory holder 30. Inventory items 40 may be accessible only from one of the faces associated with the inventory item 40. For example, inventory holder 30 may include four faces and a plurality of inventory bins. Each inventory bin may be associated with one or more particular faces. In particular, inventory bins located at a corner of inventory holder 30 may be associated with both frame faces forming the corner. In a particular embodiment, an inventory bin may only be accessed through the one or more frame faces associated with that inventory bin. Thus, when mobile drive unit 20 and inventory holder 30 arrive at inventory station 50, mobile drive unit 20 may rotate inventory holder 30 to present a particular face and allow an operator to select inventory items 40 from a particular inventory bin associated with that face. In such an embodiment of inventory system 10, management module 15 may consider the contents of faces of inventory holder 30 separately. As a result, management module 15 may select inventory holders 30 based in part on the number of requested inventory items 40 or the quantity of a single requested inventory item 40 stored on a single face of inventory holder 30.

Management module 15 may also consider, when selecting an inventory holder 30, whether a particular inventory holder 30 is located in a storage space 90 appropriate for that inventory holder 30. For example, workspace 70 may be divided into a plurality of storage regions with each storage region associated with inventory holders 30 based on a particular characteristic of inventory holders 30. In a particular embodiment, each inventory holder 30 may be assigned to a particular storage region based on how frequently the inventory items 40 stored on that inventory holder 30 are requested in retrieval requests or other inventory requests. Management module 15 may thus select an inventory holder 30 based on whether the selected inventory holder 30 is located in a storage region other than the storage region associated with that inventory holder 30. In particular, management module 15 may give preference to inventory holders 30 that are currently stored in the wrong storage region. As a result, particular embodiments of inventory system 10 may assign frequently requested inventory holders 30 storage spaces 90 closer to inventory stations 50 and may utilize retrieval requests to tune the distribution of inventory holders 30 by correcting incorrectly located inventory holders 30.

Particular embodiments of inventory system 10 may tune the location of inventory holders 30 in various manners. As one example, in particular embodiments of inventory system 10, management module 15 determines a tuning range for each a plurality of storage regions. The tuning range of a particular storage region describes the inventory holders 30 that are appropriate for storage in that storage region. The tuning region describes these inventory holders 30 by specifying a range of values appropriate for a particular characteristic of these inventory holders 30, referred to here as a "tuning value." For example, management module 15 may calculate a holder velocity for each inventory holder 30 based on how often that inventory holder 30 is selected to respond to retrieval requests and may use this holder velocity as a tuning value for tuning the location of inventory holders 30 in inventory system 10.

In such embodiments, management module 15 may tune the location of inventory holders 30 by identifying a first group of inventory holders 30 that includes some or all inventory holders 30 that currently store the requested inventory items. Management module 15 then determines a tuning differential for each inventory holder 30 in this group. The tuning differential of a particular inventory holder 30 represents a numeric measure of how far the holder velocity of that inventory holder 30 is outside the tuning range of the tuning region in which that inventory holder 30 is located. Management module 15 may then identify a second group of inventory holders 30 that have a tuning differential greater than some predetermined threshold. Management module 15 may then select, based on appropriate considerations, an inventory holder 30 from that second group. As a result, management module 15 may be able to bias the selection of inventory holders 30 towards inventory holders 30 that are, with respect to the relevant tuning value, badly misplaced in inventory system 10.

Overuse of tuning may, however, reduce the overall efficiency of inventory system 10. As a result, in particular embodiments of inventory system 10, management module 15 may use certain techniques to limit the effects of tuning on overall efficiency. In particular embodiments, management module 15 may be configured to tune the location of inventory holders 30 based on a tuning frequency. For example, management module 15 may be configured to tune the location when responding to every 100th retrieval request. As a result, every 100th retrieval request, management module 15 may consider the tuning of inventory holders 30, as described above, when selecting an inventory holder 30 to fulfill the retrieval request. For all other retrieval requests, management module 15 may select inventory holder 30 without regard for the tuning of the selected inventory holder 30. Thus, by properly configuring the tuning frequency utilized by management module 15, an operator of inventory system 10 can maximize efficient fulfillment of retrieval requests.

After selecting inventory station 50 and inventory holder 30, management module 15 selects a mobile drive to move the selected inventory holder 30 to the selected inventory station 50. In selecting mobile drive unit 20, management module 15 may, in a particular embodiment, determine which mobile drive units 20 are available to retrieve the selected inventory holder 30. To determine which mobile drive units 20 are available, management module 15 may utilize information previously stored on management module 15, or information received by management module 15 from mobile drive units 20 or other components of inventory system 10. For example, in a particular embodiment, management module 15 stores information indicating which mobile drive unit 20 are currently fulfilling inventory requests in inventory system 10. Management module 15 may then use this information to select an appropriate mobile drive unit 20 for the current retrieval request. As another example, management module 15 may poll one or more mobile drive units 20 to determine whether each of these mobile drive units 20 is available before selecting the mobile drive unit 20 to fulfill the current retrieval request. In general, mobile drive unit 20 may use any appropriate method, based on the configuration and characteristics of inventory system 10, to determine which mobile drive unit 20 are available.

After determining which mobile drive units 20 are available, management module 15 selects a particular mobile drive unit 20 from the available mobile drive units 20 to fulfill the retrieval request. Management module 15 may utilize any additional criteria to determine which of the available mobile drive units 20 to use. For example, in particular embodiment, management module 15 calculates a score for each available mobile drive unit 20. This score is based, in part, on the distance from that particular mobile drive unit 20 to the selected inventory station 50 or the selected inventory holder 30. In this embodiment, management module 15 then selects the mobile drive unit 20 with the best score. For the purposes of this example, management module 15 is assumed to have selected a particular mobile drive unit 20, shown as selected mobile drive unit 20x in FIG. 2

After selecting appropriate components of inventory system 10, management module 15 generates or retrieves information, referred to here as a "retrieval command", that identifies the selected inventory holder 30 or the location of the selected inventory holder 30 and the selected inventory station 50 or the location of the selected inventory station 50. Management module 15 then transmits this retrieval command to the selected mobile drive unit 20. Management module 15 may also transmit the retrieval command or other information to the selected inventory station 50 to be used by the operator of the selected inventory station 50 in completing the retrieval request.

After receiving the retrieval command, selected mobile drive unit 20x moves to selected inventory holder 30x, as shown by arrow 210 in FIG. 2, based on a location or other information specified in the retrieval command. Selected mobile drive unit 20x then couples to selected inventory holder 30x. After coupling to selected inventory holder 30x, selected mobile drive unit 20x moves to selected inventory station 50h as shown by arrow 220 in FIG. 2. As indicated by FIG. 2, selected mobile drive unit 20x may move selected inventory holder 30x through one or more spaces in a particular queue 80, queue 80h, that is associated with selected inventory station 50h. Moreover, selected mobile drive unit 20 may pause one or more times while moving through queue 80h so that selected mobile drive unit 20 arrives at inventory station 50 at an appropriate time. For example, selected mobile drive unit 20 may pause one or more times in queue 80h while inventory holders 30 associated with other inventory requests are processed at selected inventory station 50h.

Once selected mobile drive unit 20x has brought selected inventory holder 30x to the selected inventory station 50h, an operator associated with selected inventory station 50h may begin removing requested inventory items 40 from selected inventory holder 30x, counting the requested inventory items 40 in selected inventory holder 30x, or performing any other appropriate processing task associated with the retrieval request. Additionally, in a particular embodiment, selected inventory station 50h and/or selected mobile drive unit 20x may notify management module 15 once the retrieval request has been completed to indicate that selected inventory station 50h is available for subsequent retrieval requests or that selected mobile drive unit 20x is ready to store selected inventory holder 30x.

Thus, with the appropriate choice of selection criteria, particular embodiments of inventory station 10 can be configured to execute retrieval requests quickly, thereby increasing the throughput of inventory system 10. Additionally, by selecting components to execute retrieval requests based on the work history of those components, particular embodiments may also provide more evenly distributed workloads for components of inventory system 10 and/or human operators. Moreover, particular embodiments of inventory system 10 may be capable, in executing a particular retrieval request, of leveraging operations being executed for other inventory requests, thereby providing even greater operational benefits. As a result, inventory system 10 may provide a fast and efficient system for retrieving inventory items 40 from storage.

FIG. 3, as noted above, illustrates operation of inventory system 10 in moving inventory holders 30 to storage spaces 90 within workspace 70 of inventory system 10. Management module 15 may decide to initiate the storage operation based on an inventory request received from an operator of inventory system 10, based on communication with another component of inventory station 50, or based on any suitable event occurring in inventory system 10 or any appropriate information available within inventory system 10. For the purposes of illustration, however, the description below focuses on an embodiment of inventory system 10 in which management module 15 initiates a storage operation in response to information received from mobile drive unit 20 indicating that mobile drive unit 20 is coupled to an inventory holder 30 that is ready for storage.

After receiving information indicating that inventory holder 30 is ready for storage, management module 15 initiates the storage operation. As part of the storage operation, management module 15 may select a storage space 90 based on a classification of the inventory holder 30 to be stored and a classification of a storage space 90 selected by management module 15. The classifications used by management module 15 in selecting the storage space 90 may represent any suitable classification of inventory holder 30 and any suitable classification of storage space 90.

For example, management module 15 may utilize a holder velocity as the relevant classification of inventory holder 30. The holder velocity of an inventory holder 30 represents a measure of the frequency with which inventory items 40 stored on that inventory holder 30 are requested in inventory requests. In such an embodiment, management module 15 may also use a range of holder velocities associated with each storage space 90 as the relevant classification for storage spaces 90. Thus, management module 15 may select a storage space 90 for a particular inventory holder 30 by matching the holder velocity of the inventory holder 30 to be stored with the range of holder velocities associated with one or more available storage spaces.

In a particular embodiment, management module 15 calculates the holder velocity based on an item velocity of one or more inventory items 40 stored on that inventory holder 30. The item velocities represent, in any appropriate form, the frequency with which the relevant inventory item 40 is requested during operation of inventory system 10. In general, management module 15 may calculate the holder velocity of a particular inventory holder 30 in any appropriate manner from the inventory velocities of inventory items 40 stored on that inventory holder 30. As one example, management module 15 may calculate the holder velocity for a particular inventory holder 30 by averaging the item velocities of all the inventory items 40 stored on that inventory holder 30.

As another example, management module 15 may determine a weight for each inventory item 40 based on the number of units of that inventory item 40 stored on the relevant inventory holder 30. Management module 15 may also calculate a weighted frequency for each inventory item 40 by multiplying the item velocity for each inventory item 40 by the weight calculated for that inventory item 40. Management module 15 may then calculate the holder velocity for that inventory holder 30 by averaging the weighted frequencies of all the inventory items 40 stored on inventory holder 30.

Management module 15 then selects a storage space 90 based on the classification of the inventory holder 30 to be stored and the classification of the selected storage space 90. For example, in a particular embodiment, management module 15 utilizes holder velocities as the relevant classification for inventory holders 30, and a range of holder velocities associated with each storage space 90 as the relevant classification for storage spaces 90. Thus, management module 15 selects a particular storage space 90 for an inventory holder 30 to be stored on identifying a particular storage space 90 associated with a holder velocity range that includes the holder velocity of the inventory holder 30 to be stored.

To facilitate the selection of storage spaces 90 during storage operations, management module 15, at any appropriate time, may also define, calculate, or otherwise identify a plurality of storage regions 100 that group storage spaces 90 based on one or more characteristics of the grouped storage spaces 90. For example, management module 15 may group storage spaces 90 into storage regions 100 based on a distance between each storage space 90 and one or more inventory stations 50. Each storage region 100 may then be associated with a storage space classification that management module 15 uses in selecting an appropriate storage space 90, as described above. For example, management module 15 may associate a range of holder velocities with each of these storage regions 100.

In the illustrated embodiment, management module 15 divides storage spaces 90 into storage regions 100a-d based on a distance between each storage space 90 and a group of one or more inventory stations 50. For example, management module 15 may assign each storage space 90 to a particular storage region 100 based on one or more distances between that storage space 90 and any one or more inventory stations 50 in inventory system 10. Management module 15 may assign each storage space 90 based on a maximum distance, a minimum distance, an average distance or any other one or more distances between that storage space 90 and inventory stations 50 of inventory system 10.

Alternatively, management module 15 may identify a group of inventory stations 50 based on a station criteria. The station criteria defines a particular characteristic, property, consideration, and/or criteria for inventory stations 50 to be included in the group. The station criteria may pertain to the active status of inventory stations 50 in the group, the type of inventory requests that the inventory stations 50 are configured to process, or any other appropriate characteristic of inventory stations 50. Thus, management module 15 may identify the group of all currently active inventory stations 50, all inventory stations 50 currently configured to process retrieval and/or replenishment requests, or any other group of inventory stations 50 depending on the station criteria used. After identifying the inventory stations 50 in the group, management module 15 may divide storage spaces 90 into storage regions 100 based on one or more distances between each storage space 90 and the inventory stations 50 in the group.

Additionally, management module 15 may update the group of inventory stations 50 and reassign storage spaces 90 to storage regions 100 based on one or more distances between each storage space 90 and inventory stations 50 in the updated group. For example, management module 15 may detect that an additional inventory station 50 has become active. In response to detecting the new inventory station 50, management module 15 may identify an updated group of inventory stations 50 based on the station criteria. Management module 15 may then reassign storage spaces 90 to storage regions 100 based on a maximum distance, a minimum distance, an average distance, or any other one or more distances between each storage space and the inventory stations 50 in the updated group.

After grouping storage spaces 90 into storage regions 100 based on the appropriate characteristic of storage spaces 90, such as a distance to one or more inventory station 50, management module 15 may select a storage region 100 for the inventory holder 30 to be stored based on a classification of that inventory holder 30 and a classification associated with the selected storage region 100 and/or the storage spaces 90 within that storage region 100. For example, management module 15 may select a storage region 100 based on the holder velocity of a particular inventory holder 30 and a range of holder velocities associated with the selected storage region 100. Management module 15 may then select a particular storage space 90 within that storage region 100 based on any additional criteria. For example, management module 15 may select a particular storage space 90 within the selected storage region 100 based on a distance between the selected storage space 90 and the inventory holder 30 to be stored.

In the illustrated embodiment, management module 15, at an appropriate time, defines storage regions 100 by grouping storage spaces 90 based on the average distance between each storage space 90 and all inventory stations 50 in inventory system 10. Management module 15 also associates a range of holder velocities with each storage region 100. For the sake of illustration, it is assumed that storage region 100a is associated with a range of holder velocities greater than 0.3, that storage region 100b is associated with holder velocities between 0.3 and 0.2, that storage region 100c is associated with holder velocities between 0.2 and 0.1, and that storage region 100d is associated with holder velocities less than 0.1. Then after initiating a storage operation, management module 15 selects a storage region 90 for inventory holder 30x. For the sake of illustration, it is assumed that inventory holder 30x has a holder velocity of 0.15. Thus, in the illustrated embodiment, management module 15 selects a particular storage region 100 associated with a range of holder velocities that includes the holder velocity, 0.15, of inventory holder 30x or, in this case, storage region 100c. After selecting storage region 100c, management module 15 then selects a storage location 90 from among the available storage locations 90 in storage region 100c, storage locations 90a-c. In particular, management module 15 selects from storage spaces 90a-c the storage space 90 closest to inventory holder 30x. As illustrated in FIG. 3, the closest storage space 90a-c is storage space 90c.

By selecting a storage space 90 for a particular inventory holder 30 based, in part, on the holder velocity of that inventory holder 30, management module 15 may be able to select remote or otherwise undesirable storage spaces 90 for inventory holders 30 with lower holder velocities and select easily accessible or otherwise desirable storage spaces 90 for inventory holders 30 with higher holder velocities. This may reduce the time needed to move the most frequently requested inventory items 40 to inventory stations 50 for processing, thereby reducing the amount of time taken to fulfill certain types of inventory requests.

After selecting a storage space 90, management module 15 transmits information identifying the selected storage space 90 to the appropriate mobile drive unit 20. Upon receiving this information, the relevant mobile drive unit 20 moves the inventory holder 30 to the selected storage space 90, as indicated in FIG. 3 by arrow 310. Mobile drive unit 20 may then undock from the inventory holder 30 after arriving at the selected storage space 90. Mobile drive unit 20 may then move away from the selected storage space 90, leaving the inventory holder 30 in the selected storage space 90, and begin responding to other inventory requests. In the illustrated embodiment, this is shown by arrow 320.

Additionally, in a particular embodiment of inventory system 10, management module 15 may store information related to the availability of each storage space 90. In such an embodiment, mobile drive unit 20 may notify management module 15 that the selected storage space 90 is now full. Management module 15 may alternatively determine that the selected storage space 90 is no longer available using other techniques depending on the configuration of inventory system 10. As a result, management module 15 may independently generate and store information indicating that the selected storage space 90 is now full. Management module 15 may then use this information in selecting storage spaces 90 for subsequent storage operations or in fulfilling other types of inventory requests. Furthermore, management module 15 may store information identifying the location of inventory holders 30 and/or inventory items 40 in inventory system 10 and, thus, may store information describing the new location and/or the contents of the stored inventory holder 30.

Consequently, particular embodiments of inventory system 10 may provide an optimized method for selecting storage spaces 90 for inventory holders 30. This may improve the ability of inventory system 10 to respond to subsequent retrieval and replenishment requests efficiently. As a result, the store procedure utilized by particular embodiments of inventory system 10 may provide significant operational benefits.

FIG. 4 illustrates operation of inventory system 10 in replenishing an inventory holder 30 within workspace 70. During execution of a replenishment operation, mobile drive unit 20 moves inventory holder 30 from a storage space 90 to inventory station 50 to be filled with inventory items 40. By selecting inventory holder 30 for the inventory item 40 to be stored based on a classification of the inventory item 40 to be stored and a classification of one or more inventory items 40 already on the selected inventory holder 30, particular embodiments of inventory system 10 may group and store inventory items 40 in a manner that results in more efficient operation of inventory system 10.

Management module 15 decides at an appropriate time to initiate a replenishment operation. Management module 15 may decide to initiate the replenishment operation based on a predetermined replenishment schedule or in response to receiving a particular type of inventory request, referred to here as a "replenishment request", that identifies an inventory item 40 to be added to inventory system 10. For example, inventory system 10 may be configured to replenish inventory holders 30 every evening and management module 15 may initiate a replenishment operation for appropriate inventory holders 30 on a daily basis. Alternatively, management module 15 may receive information from an inventory station 50 or another component indicating that inventory system 10 has received a delivery of inventory items 40 that are ready to be stored in inventory holders 30. In the illustrated embodiment, inventory station 50z is assumed to have transmitted a replenishment request to management module 15 in response to receiving a pallet of inventory items 40z to be stored.

In executing a replenishment operation, management module 15 selects an inventory holder 30 and a mobile drive unit 20. Additionally, in certain circumstances, management module 15 may also select an inventory station 50 at which to complete the replenishment operation. Management module 15 may choose inventory holder 30, mobile drive unit 20 and, if appropriate, inventory station 50 in any appropriate order. Additionally, management module 15 may use any suitable factors, criteria, or considerations in choosing the selected inventory holder 30, mobile drive unit 20, and inventory station 50.

In a particular embodiment, management module 15 selects inventory holder 30 based on a classification of the inventory item 40 to be stored and a classification of one or more inventory items 40 already on the selected inventory holder 30. For example, in a particular embodiment, management module 15 groups more frequently requested inventory items 40 on particular inventory holders 30 and less frequently requested inventory items 40 on other inventory holders 30 and then stores the more frequently requested inventory items 40 in storage spaces 90 that are closer to inventory stations 50. As a result, management module 15 may be able to reduce the time required to complete retrieval operations and other tasks executed by inventory system 10 by keeping frequently-requested inventory items 40 close to inventory stations 50.

In such an embodiment, management module 15 calculates an item velocity for each inventory item 40 stored on inventory system 10. The item velocity may represent any suitable value determined based in any manner on a frequency with which that inventory item 40 is requested during operation of inventory system 10. For the purposes of this description and the claims that follow, an inventory item 40 is considered to be "requested" whenever that inventory item 40 is involved in an activity undertaken within inventory system 10 or any designated subset of the activities undertaken within inventory system 10. A particular inventory item 40 may be requested as a result of management module 15 receiving any inventory request that identifies the inventory item 40 or, alternatively, a particular type of inventory request, such as a retrieval request, that identifies the inventory item 40 in question. As one example, inventory system 10 may represent a mail-order warehouse, and management module 15 may determine item velocities for each inventory item 40 based in some manner on the frequency with which that inventory item 40 is retrieved to fulfill merchandise orders received by the warehouse. As another example, inventory system 10 may represent a facility for processing returned merchandise, and management module 15 may calculate the item velocities for each inventory item 40 based on the frequency with which that inventory item 40 is returned by customers. In general, the item velocity may represent any suitable calculation or measure based, in any appropriate manner, on the frequency with which the relevant inventory item 40 is requested for any one or more operations performed by inventory system 10.

Additionally, the item velocity may reflect the frequency with which the inventory item 40 is requested over a predetermined absolute time period, over an amount of time defined with respect to particular events, or within any other suitable measurement of time. As one example, the item velocity may reflect the average number of requests for a particular inventory item 40 that are received in a single day. As another example the item velocity may reflect the number of times that inventory item 40 is requested in a given number of inventory requests. As a further example, the item velocity may be manually set by a warehouse manager in anticipation of an inventory item becoming popular or unpopular.

After determining item velocities for appropriate inventory items 40, management module 15 may select an inventory holder 30 based in some appropriate manner on the item velocity of the inventory item 40 to be stored and the item velocity of one or more inventory items 40 on each inventory holder 30. For example, in a particular embodiment, management module 15 calculates a holder velocity for each inventory holder 30 in inventory system 10, the holder velocity representing the average item velocity of inventory items 40 stored on that inventory holder 30. Management module 15 may then select the inventory holder 30 based on a velocity difference of the inventory holder 30, the velocity difference representing the difference between the item velocity of the inventory item 40 to be stored and the holder velocity of the selected inventory holder 30.

By minimizing the velocity difference in selecting inventory holders 30, management module 15 may be able to group inventory items 40 in inventory holders 30 based on item velocities of the stored inventory items 40. Inventory system 10 may then store the selected inventory holder 30 based on the holder velocity of the selected inventory holder 30. As a result, management module 15 may be able to group and store less frequently requested inventory items 40 far from inventory stations 50 and more frequently requested inventory items 40 close to inventory stations 50.

Additionally, in particular embodiments, management module 15 may be configured to create diversely-stocked inventory holders 30. Because grouping inventory items 40 based solely on item velocity may produce inventory holders 30 that contain only a single or a small number of different inventory items 40, management module 15 may consider the marginal benefit of storing the inventory item 40 in a particular inventory holder 30 before selecting that inventory holder 30. More specifically, management module 15 may, when selecting inventory holder 30, consider an increase in the likelihood that one or more inventory items 40 stored on that inventory holder 30 would be requested in an inventory request received by management module 15.

In such an embodiment, management module 15 may calculate, for inventory holders 30, one or more pick number probabilities associated with one or more pick numbers. Each pick number probability represents a likelihood that a single inventory request will request a number of inventory items 40 stored on inventory holder 30 that is equal to the pick number. For example, for a pick number probability of three, management module 15 calculates the likelihood that a single inventory request will request three inventory items 40 that are stored on inventory holder 30. In a particular embodiment, management module 15 is configured to calculate a pick number probability for pick numbers of one, two, and three. These pick numbers represent, respectively, the likelihood that a single inventory request received by management module 15 will identify one, two, and three inventory items 40 stored on inventory holder 30. Furthermore, management module 15 may calculate these pick number probabilities for the relevant inventory holders 30 based on the inventory items 40 currently stored on those inventory holder 30. Management module 15 may then re-calculate these pick number probabilities for each of the relevant inventory holders 30 assuming the inventory item 40 to be stored is added to that inventory holder 30 and may update the pick number probabilities as appropriate.

Management module 15 may then calculate a usefulness value for each inventory holder 30 representing the sum of the pick probabilities calculated for that inventory holder 30. More specifically, management module 15 may calculate a first usefulness value based on the inventory items 40 currently stored on the inventory holder 30 and a second usefulness value based on the contents of inventory holder 30 if the inventory item 40 to be stored were added to that inventory holder 30. Management module 15 may then determine a usefulness differential for each inventory holder 30 based on a change in the usefulness value that would result if the inventory item 40 to be stored were added to the inventory holder 30. Management module 15 may then select inventory holder 30 based, in part, on this usefulness differential. Because the usefulness differential will be greater for inventory holders 30 that do not already hold the inventory item 40 in question, inventory system 10 may, as a result of these replenishment techniques, create inventory holders 30 that hold a diverse collection of inventory items 40.

Management module 15 may then select an inventory holder 30 on which to store inventory item 40 based, in any appropriate manner, on the item velocity of the inventory item 40 to be stored and the holder velocity and usefulness differential of the selected inventory holder 30. For example, in a particular embodiment, management module 15 calculates a velocity similarity for each inventory holder 30, equal to one minus the absolute value of the difference between the item velocity of inventory item 40 and the holder velocity of that inventory holder 30. Management module 15 then also calculates a score for each inventory holder 30 based on the product of the velocity similarity and the usefulness differential. By selecting inventory holder 30 based on these values, management module 15 may be able produce inventory holders 30 that contain a diverse selection of inventory items 40 with similar item velocities. In the illustrated embodiment, management module 15 is assumed to have selected inventory holder 30z on which to store inventory items 40z.

After selecting inventory holder 30, management module 15 may then select a particular mobile drive unit 20 to transport that inventory holder 30 and, if appropriate, a particular inventory station 50 to complete the replenishment operation. Management module 15 may use any appropriate criteria, factors, or considerations in selecting mobile drive unit 20 and inventory station 50. For example, in a particular embodiment, an inventory station 50 receives a pallet of inventory items 40 to be stored in inventory system 10 and transmits a replenishment request to management module 15 specifying the inventory items 40 to be stored. In such an embodiment, management module 15 may select only an appropriate inventory holder 30 on which to store the inventory item 40 and, from a pool of currently available mobile drive units 20, the mobile drive unit 20 closest to the selected inventory holder 30 to transport the selected inventory holder 30 to the inventory station 50 that transmitted the replenishment request. As indicated above, in the illustrated embodiment, inventory station 50z is assumed to have transmitted the replenishment request to management module 15 in response to receiving a pallet of inventory items 40z to be stored.

In alternative embodiments, management module 15 may generate the replenishment request itself and subsequently selects the inventory station 50 from a group of inventory stations 50 that may include, depending on the configuration of inventory system 10, all inventory stations 50 in inventory system 10 or all currently active inventory stations 50. Moreover, inventory system 10 may have reconfigurable inventory stations 50 that may, at any particular time, be designated to process only one of many different types of inventory requests. For example, each inventory station 50 may, at a given time, be configured to handle only retrieval requests or only replenishment requests. In such an embodiment, management module 15 may select the inventory station 50 from a group of inventory stations 50 that includes all active inventory stations 50 that are currently configured to process replenishment requests.

After management module 15 has selected an appropriate inventory holder 30, mobile drive unit 20 and inventory station 50, management module 15 may then transmit information identifying the selected inventory holder 30 and the selected inventory station 50 to the selected mobile drive units 20. Alternatively, management module 15 may transmit information identifying a location of the selected inventory holder 30 and/or a location of the selected inventory station 50 to the selected mobile drive unit 20. Management module 15 may also transmit additional information pertaining to the replenishment request to the selected inventory station 50, such as a number of units of the inventory item 40 to store in the selected inventory holder 30, a particular bin on the selected inventory holder 30 in which to place the inventory item 40, or any other appropriate information to be used in processing the replenishment request.

The selected mobile drive units 20 then moves to the selected inventory holder 30 and couples to the selected inventory holder 30. This is illustrated in FIG. 4 by arrow 410. After coupling to the inventory holder 30, the selected mobile drive unit 20 then moves the selected inventory holder 30 to the selected inventory station 50. This is illustrated in FIG. 4 by arrow 420.

Once the selected inventory holder 30 arrives at the selected inventory station 50, an operator at the selected inventory station 50 may process the replenishment request in any appropriate manner. In a particular embodiment, the operator stores a predetermined number of units of the inventory item 40 to be stored in the selected inventory holder 30. Inventory station 50 or the operator of inventory station 50 may then transmit information to management module 15 or other components of inventory system 10 indicating that the replenishment request has been completed. Inventory system 10 may then execute a storage operation using, for example, the techniques described above to return the selected inventory holder 30 to a storage space 90 in workspace 70.

Although the above description focuses on an embodiment of inventory system 10 that utilize a single mobile drive unit 20, inventory holder 30, and inventory station 50 in completing the replenishment operation, inventory system 10 may utilize any appropriate number of inventory holders 30, mobile drive units 20, and inventory stations 50 to complete the replenishment operation. For example, the replenishment request may identify multiple inventory items 40 to be stored and management module 15 may select one or more inventory holders 30 in which to store these inventory items 40 and one or more mobile drive units 20 to transport the selected inventory holders 30.

Additionally, in particular embodiments, management module 15 may, during replenishment operations, distribute the storage of a single inventory item 40 over multiple inventory holders 30. Management module 15 may store the inventory item 40 in multiple inventory holders 30 to spread the inventory item 40 among many inventory holder 30 and thereby allow inventory system 10 to store that inventory item 40 in several places in workspace 70. More specifically, management module 15 may allocate a portion of a replenishment quantity specified by the replenishment request to a first selected inventory holder 30. Management module 15 may then select additional inventory holders 30 and allocate additional portions of the replenishment quantity to the additional inventory holders 30 until all of the remaining replenishment quantity has been allocated to a particular inventory holder 30.

Management module 15 may also use multiple inventory holders 30 to store the inventory item 40 when management module 15 determines that a first selected inventory holder 30 does not possess enough unused storage capacity to store all the units of the inventory item 40 specified by the replenishment request. More specifically, management module 15 may determine that the replenishment quantity exceeds an unused storage capacity of the first selected inventory holder 30. The unused storage capacity may represent all the unused storage capacity of the selected inventory holder 30, unused capacity in currently empty bins of the selected inventory holder 30, unused capacity in bins of the selected inventory holder 30 that are already storing the inventory item 40, or any other suitable measure of unused storage capacity. As a result of determining that the replenishment quantity exceeds the unused storage capacity of the first selected inventory holder 30, management module 15 may select additional inventory holders 30 as needed until the unused storage capacity of all the selected inventory holders 30 is equal to or greater than the replenishment quantity.

Furthermore, although the above description focuses on an embodiment of inventory system 10 that selects an inventory holder 30 based on item velocities and/or product diversity considerations, management module 15 may select inventory holder 30 based on any appropriate classification of the relevant inventory items 40. For example, management module 15 may select inventory holder 30 based on expiration dates of the relevant inventory items 40; restocking schedules; a season or event associated with the relevant inventory items 40, such as Halloween or Easter; a common theme associated with the relevant inventory items 40, such as baseball equipment or cooking utensils; synergy between inventory items such that they are commonly ordered together; and/or any other appropriate classification of the relevant inventory items 40. By grouping inventory items 40 on inventory holders 30 based on one or more classifications of the relevant inventory items 40, particular embodiments of inventory system 10 may distribute inventory items 40 among inventory holders 30 in a manner that allows for more intelligent storage of inventory holders 30.

Additionally, by creating inventory holders 30 that offer a diverse selection of inventory items 40, management module 15 may increase the likelihood that a selected inventory holder 30 will be able to provide multiple inventory items 40 requested by any given inventory request. This may further reduce the amount of time needed to fulfill subsequent inventory requests. Thus, the described replenishment techniques may increase operational efficiency of particular embodiments of inventory system 10.

FIG. 5 is a flowchart illustrating example functionality of a particular embodiment of management module 15 in executing a retrieval operation. In the described embodiment, the process begins at step 500 with management module 15 receiving a retrieval request that identifies an inventory item 40. After receiving the retrieval request, management module 15 selects an inventory station 50 at which the retrieval request will be fulfilled. As noted above, management module 15 may utilize any appropriate criteria, factors, or considerations in selecting an appropriate inventory station 50. In the illustrated embodiment, management module 15 calculates a score for each available inventory station 50 and selects an inventory station 50 based on its score. These calculations may be performed when management module 15. Alternatively, management module 15 may perform the calculation at other appropriate times and store the results for later use in responding to a retrieval request.

In calculating the scores for inventory stations 50, management module 15 calculates, at step 510, a time-to-fill value for each inventory station based on a distribution of the inventory item 40 relative to each inventory station 50. Management module 15 also calculates a drive-unit density value for each inventory station 50, at step 520, based on a distribution of available mobile drive units 20 relative to each inventory station 50. Additionally, management module 15 calculates a workload value for each inventory station 50, at step 530, based on an amount of work that has been performed at that inventory station 50 over a predetermined time period. Management module 15 also calculates a queue capacity value for each inventory station 50, at step 540, based on contents of a queue associated with that inventory station 50. At step 550, management module 15 then sums the time-to-fill value, the drive-unit density value, the workload value, and the queue capacity value for each inventory station 50 to produce a score for that inventory station 50. Management module 15 selects the inventory station 50 with the best score at step 560. More specifically, in the described embodiment, management module 15 selects the inventory station 50 with the highest score.

After selecting an inventory station 50, management module 15 selects an inventory holder 30 that stores the requested inventory item 40 at step 570. As noted above, management module 15 may select the inventory holder 30 based on any appropriate factors, criteria, or considerations. Examples of such factors may include, but are not limited to, the contents of inventory holders 30, their location relative to inventory stations 50 or mobile drive units 20, existing assignments of inventory holders 30, tuning considerations, and/or any other appropriate factors.

At step 580, management module 15 selects a mobile drive unit 20 to move the selected inventory holder 30 to the selected inventory station 50. As noted above, management module 15 may also select the mobile drive unit 20 based any appropriate factors, criteria, or considerations. Examples of such factors may include, but are not limited to, the location of mobile drive units 20 relative to the selected inventory station 50 or the selected inventory holder 30. After selecting an inventory station 50, an inventory holder 30, and a mobile drive unit 20, management module 15 transmits information identifying the selected inventory station 50 and the selected inventory holder 30 to the selected mobile drive unit 20 at step 590.

After management module 15 has transmitted this information to the selected mobile drive unit 20, appropriate elements of inventory system 10 may perform appropriate actions to complete the retrieval operation. For, in particular embodiments, the selected mobile drive unit 20 moves to the selected inventory holder 30. The selected mobile drive unit 20 then couples to the selected inventory holder. The selected mobile drive unit 20 then moves the selected inventory holder 30 to the selected inventory station 50. An agent or operator located at the selected inventory station 50 may then select the requested inventory item 40 from the selected inventory holder 30 and placing the inventory item 40 in a box to be shipped to a customer and/or take any other suitable actions to complete the retrieval operation.

FIG. 6 is a flowchart illustrating example functionality of a particular embodiment of management module 15 in executing a storage operation. The process begins at step 600 with management module 15 detecting that an inventory holder 30 is available for storage. As described above, storage operations may be executed at any appropriate time, including at the completion of a retrieval request. Thus, management module 15 may detect that an inventory holder 30 is available for storage by determining that a previously received retrieval request has been completed by suitable components of inventory system 10 and that one or more inventory holders 30 involved in the fulfillment of the retrieval request are now available to be stored.

Management module 15 then determines a classification of the inventory holder 30 to be stored at step 610. This classification of inventory holder 30 may describe any appropriate characteristic, attribute, or value or collection of characteristics, attributes, or values associated with the relevant inventory holder 30. In particular embodiments, management module 15 determines the classification by determining a holder velocity of the inventory holder 30 that specifies the frequency with which the inventory items 40 stored in the relevant inventory holder 30 are requested in retrieval requests received by management module 15.

At step 620, management module 15 determines a classification associated with each of a plurality of storage locations 90. This classification of inventory holder 30 may describe any appropriate characteristic, attribute, or value or collection of characteristics, attributes, or values associated with the relevant storage location 90. In particular embodiments, management module 15 determines these classifications by determining a range of holder velocities associated with each storage location 90. For example, management module 15 may divide storage locations 90 into a plurality of storage regions 100 and assign a range of holder velocities to each storage region 100 based on appropriate criteria, such as the distance between the storage locations and one or more inventory stations. This may allow management module 15 to assign inventory holders 30 with less frequently requested inventory items 40 to storage regions 100 further removed from inventory stations 50. Although, in the described embodiment, management module 15 determines the classifications of the relevant storage locations 90 at the time of the storage operation, in alternative embodiments, management module 15 may determine the classifications of the relevant storage locations 90 at other appropriate times and store these classifications for use during subsequent storage operations.

At step 630, management module 15 selects an available storage location 90 for the inventory holder 30 to be stored based on the classification of the relevant inventory holder 30 and the classification of the selected storage location 90. For example, in particular embodiments, management module 15 identifies a storage region 100 that is assigned a range of holder velocities that includes the holder velocity of the relevant inventory holder 30. Management module 15 then selects an available storage location 90 from the identified storage region 100.

After selecting a storage location 90, management module 15 may reserve the selected storage location 90, at step 640, for use by the inventory holder 30 to be stored. Management module 15 may reserve the selected storage space 90, in any appropriate manner based on the configuration of inventory system 10. For example, in particular embodiments, management module 15 maintains a map of all storage locations 90 that indicates whether a particular storage location 90 is available for use. In such embodiments, management module 15 may reserve the selected storage location 90 by marking the selected storage location 90 as unavailable on the map. At step 650, management module 15 transmits information identifying the storage location 90 to a mobile drive unit 20 associated with the inventory holder 30. For example, if inventory holder 30 was just involved in a retrieval request, the associated mobile drive unit 20 may be the mobile drive unit 20 that moved that inventory holder 30 to the inventory station 50 where the retrieval request was fulfilled.

After management module 15 has transmitted this information to the associated mobile drive unit 20, appropriate elements of inventory system 10 may perform appropriate actions to complete the storage operation. In particular embodiments, the associated mobile drive unit 20 moves the inventory holder 30 to the selected storage location 90. The associated mobile drive unit 20 then uncouples from the inventory holder 30. The associated mobile drive unit 20 then moves away, leaving the inventory holder 30 behind in the selected storage location 90.

Figure 7:
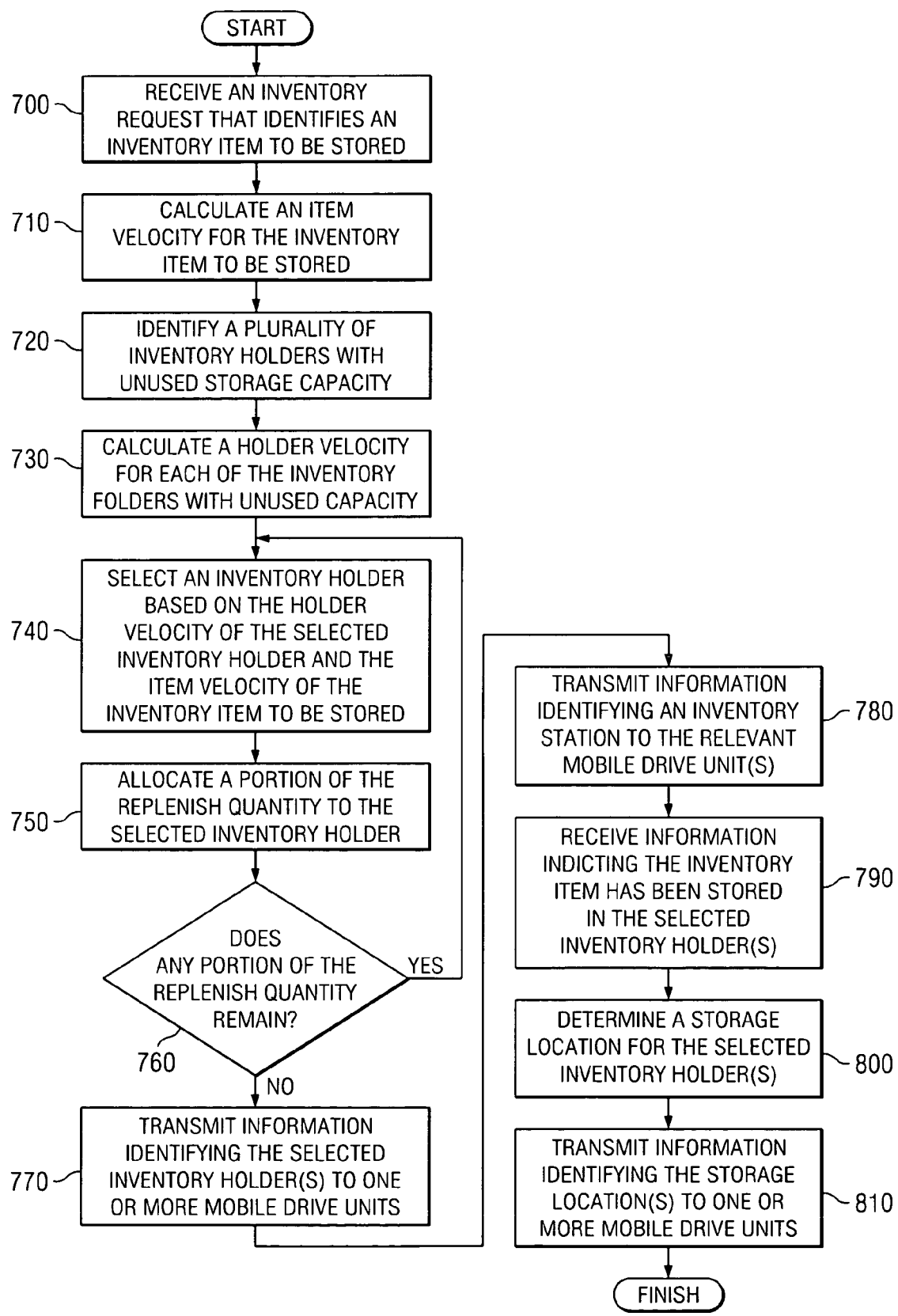
FIG. 7 is a flowchart illustrating operation of a particular embodiment of the inventory system while replenishing the inventory holder.

FIG. 7 is a flowchart illustrating example functionality of a particular embodiment of management module 15 in executing a replenishment operation. The method begins at step 700 with management module 15 receiving an inventory request that identifies an inventory item 40 to be stored in inventory system 10. In response to receiving the inventory request, management module 15 determines a classification of the inventory item to be stored. In particular, in the described embodiment, management module 15 determines the classification of the inventory item 40 to be stored by calculating an item velocity for the inventory item 40 to be stored at step 710. In particular embodiments, this item velocity is calculated based, at least in part, on a frequency with which the inventory item 40 to be stored is requested in inventory requests received by management module 15 and/or other elements of inventory system 10.

At step 720, management module 15 identifies a plurality of inventory holders 30 with unused storage capacity. In particular embodiments, the inventory holders 30 with unused storage capacity may represent inventory holders 30 having an empty storage bin, inventory holders 30 having unused storage capacity in a storage bin currently storing the inventory item 40 to be stored, or inventory holders 30 with any other form of unused capacity. Management module 15 then determines a classification for each of the plurality of inventory holders 30 with unused capacity. More specifically, in the described embodiment, management module 15 determines the classifications of the relevant inventory holders 30 calculating a holder velocity for each of the inventory holders 30 with unused capacity at step 730.

Management module 15 selects an inventory holder 30 from the inventory holders having unused storage capacity based, at least in part, on the classification of the inventory item to be stored and a classification of one or more other inventory items 40 currently stored in the selected inventory holder 30. In the described embodiment, management module 15 selects the inventory holder 30, at step 740, based on the holder velocity of the selected inventory holder 30 and the item velocity of the inventory item 40 to be stored. In particular embodiments, management module 15 may also select an inventory holder 30 based on the usefulness value described above, and/or on any other values, criteria, characteristics, or factors associated with the relevant inventory holders 30.

At step 750, management module 15 allocates, to the selected inventory holder 30, a first portion of a replenish quantity of the inventory item 40 to be stored. In particular embodiments, inventory holder 30 may allocate a portion equal to the unused storage capacity possessed by the selected inventory holder 30. At step 760, management module 15 determines whether any portion of replenish quantity remains after the first portion has been allocated to the selected inventory holder 30. If so, management module 15 may repeat steps 740-760, selecting additional inventory holders 30 until all of the replenish quantity is allocated.

Once management module 15 has allocated all of the replenish quantity to particular inventory holders 30, management module 15 transmits to one or more mobile drive unit 20, information identifying the selected inventory holder(s) 40 at step 770. If management module 15 has selected multiple inventory holders 30, in particular embodiments, management module 15 may transmit multiple sets of information, with each set of information transmitted to a different mobile drive unit 20 and each set identifying a different one of the selected inventory holders 30. At step 780, management module 15 may also transmit information identifying an inventory station 50 at which the replenishment request will be completed to the relevant mobile drive units 20. Management module 15 may select the inventory station 50 based on any suitable criteria, receive information identifying the inventory station 50 as part of the replenishment request, and/or determine the inventory station 50 to be used in completing the replenishment request in any other manner appropriate based on the configuration of inventory system 10. The relevant mobile drive units 20 may then move the selected inventory holder(s) 30 to the inventory station 50 at which the replenishment will be completed.

Additionally, in particular embodiments, management module 15 may also execute certain steps to facilitate the return of the selected inventory holders 30 to storage after the inventory items 40 in question have been stored in the selected inventory holders 30. For example, in the described embodiment, management module 15 receives information indicating the inventory item 40 to be stored has been stored in the selected inventory holder(s) 30 at step 790. At step 800, management module 15 determines a storage location for the selected inventory holder(s) 30. In particular embodiments, if management module 15 has selected multiple inventory holders 30 to complete the replenishment request, management module 15 may determine a storage location for each of the selected inventory holders 30. At step 810, management module 15 transmits information identifying the storage location determined for the selected inventory holders 30 to one or more mobile drive units 20. In particular embodiments, if management module 15 has selected multiple inventory holders 30, management module 15 may transmit information identifying the storage location determined for each of the selected inventory holders 30 to a mobile drive unit 20 associated with that inventory holder 30. These mobile drive units 20 may then move the selected inventory holders 30 to the storage locations determined by management module 15. In alternative embodiments, a single mobile drive unit 20 may be responsible for returning all inventory holders 30 to storage and management module 15 may transmit information identifying storage locations for all of the selected inventory holders 30 to that one mobile drive unit 20. That mobile drive unit 20 may then move each of the selected inventory holders 30 to the storage location selected for that inventory holder 30.

Although FIGS. 5-7 illustrate steps executed by particular embodiments of management module 15 in a particular order, alternative embodiments of management module 15 may perform all, some, or none of these steps and may do so in any appropriate order. Moreover, any two or more of the steps illustrated in any of FIGS. 5-7 may be combined, modified or deleted where appropriate and additional steps may also be added. Furthermore, although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for retrieving inventory items within an inventory system, comprising:
   receiving a retrieval request that identifies an inventory item;
   selecting, from a plurality of inventory stations, an inventory station to fulfill an order associated with the retrieval request;
   selecting an inventory holder from a plurality of inventory holders that store the inventory item; and
   selecting, from a plurality of mobile drive units, a mobile drive unit to move the selected inventory holder to the selected inventory station.

2. The method of claim 1, further comprising transmitting information identifying the selected inventory station and the selected inventory holder to the selected mobile drive unit.

3. The method of claim 1, further comprising transmitting information identifying a position of the selected inventory station and a position of the selected inventory holder to the selected mobile drive unit.

4. The method of claim 1, further comprising:
   moving the selected mobile drive unit to the selected inventory holder;
   coupling the selected mobile drive unit to the selected inventory holder; and
   moving the selected mobile drive unit and the selected inventory holder to the selected inventory station.

5. The method of claim 1, wherein selecting the inventory station comprises selecting the inventory station based, at least in part, on one of:
   one or more distances between the selected inventory station and one or more inventory holders;
   one or more distances between the selected inventory station and one or more mobile drive units;

an amount of work performed at the selected inventory station over a predetermined period of time; and
contents of a queue associated with the selected inventory station.

6. The method of claim 1, wherein selecting the inventory station comprises:
calculating a score for each of the plurality of inventory stations by performing one or more of the following:
calculating a time-to-fill value for that inventory station based, at least in part, on a distribution of the inventory item relative to the inventory station;
calculating a drive-unit density value for that inventory station based, at least in part, on a distribution of available mobile drive units relative to the inventory station;
calculating a workload value for that inventory station based, at least in part, on an amount of work that has been performed at that inventory station over a predetermined time period; and
calculating a queue capacity value for that inventory station that is determined based, at least in part, on contents of a queue associated with the inventory station; and
selecting the inventory station based, at least in part, on the calculated scores.

7. The method of claim 6, wherein calculating the score further comprises calculating the score based, at least in part, on a sum of the time-to-fill value, the drive-unit density value, the workload value, and the queue capacity value.

8. The method of claim 6, wherein:
receiving the retrieval request comprises receiving a retrieval request identifying a plurality of inventory items; and
calculating the score comprises calculating a score for each of a plurality inventory stations based, at least in part, on a time-to-fill value that is based, at least in part, on a distribution of each of the plurality of inventory items relative to the inventory station.

9. The method of claim 6, wherein calculating the time-to-fill value, for a particular inventory station, comprises:
determining a time-to-deliver value with respect to each inventory holder currently storing the inventory item, based on a distance between the inventory station and that inventory holder; and
determining an inverse time-to-deliver value for each time-to-deliver value comprising an inverse of that time-to-deliver value; and
calculating the time-to-fill value for the inventory station based, at least in part, on a sum of the inverse time-to-deliver values.

10. The method of claim 6, wherein calculating the time-to-fill value comprises setting the time-to-fill value equal to a predetermined minimum if an inventory holder currently storing the inventory item has already been selected for an order that is being fulfilled at that inventory station.

11. The method of claim 6, wherein receiving a retrieval request comprises receiving a retrieval request identifying a plurality of inventory items, and wherein calculating the time-to-fill value for a particular inventory station comprises:
determining an item density for the inventory station with respect to each inventory item identified in the retrieval request by:
determining a time-to-deliver value with respect to each inventory holder currently storing that inventory item based on a distance between the inventory station and that inventory holder;
determining an inverse time-to-deliver value for each time-to-deliver value comprising an inverse of that time-to-deliver value; and calculating the item density value for each inventory item based, at least in part, on a sum of the inverse time-to-deliver values;
determining an inverse density value for each item density value based, at least in part, on an inverse of that item density value; and
calculating the time-to-fill value for the inventory station based, at least in part, on a sum of the inverse density values for that inventory station.

12. The method of claim 1, wherein selecting the inventory holder comprises selecting the inventory holder based, at least in part, on one or more of:
a quantity of the inventory item currently stored on the selected inventory holder; and
a quantity of the inventory item currently stored on a particular face of the selected inventory holder.

13. The method of claim 1, wherein selecting the inventory holder comprises selecting the inventory holder based, at least in part, on one or more distances between the selected inventory holder and all active inventory stations.

14. The method of claim 1, wherein selecting the inventory holder comprises selecting the inventory holder based, at least in part, on one or more distances between the selected inventory holder and all active inventory stations that are currently configured to process retrieval requests.

15. The method of claim 1, wherein selecting the inventory holder comprises selecting the inventory holder based, at least in part, one or more distances between the selected inventory holder and one or more mobile drive units.

16. The method of claim 1, wherein the retrieval request identifies a plurality of inventory items and wherein selecting the inventory holder comprises selecting the inventory holder based, at least in part, on a quantity of inventory items that are both identified in the retrieval request and currently stored in the inventory holder.

17. The method of claim 1, wherein selecting the inventory holder comprises selecting the inventory holder based, at least in part, on whether the inventory holder is located in a storage region associated with that inventory holder.

18. The method of claim 1, wherein selecting the inventory holder comprises selecting the inventory holder based, at least in part, on whether the selected inventory holder will have an additional empty bin as a result of being used to fulfill the retrieval request.

19. The method of claim 1, wherein selecting an inventory holder comprises;
determining a tuning range for a plurality of storage regions;
identifying a first group of inventory holders currently storing the inventory item;
determining a tuning differential for each inventory holder within the first group based, at least in part, on a tuning value of the inventory holder and the tuning range of the storage region in which the inventory holder is located;
identifying a second group of inventory holders for which the tuning differential is greater than a tuning threshold; and
selecting an inventory holder from the second group.

20. The method of claim 18, wherein selecting an inventory holder from the second group comprises:
deciding, based on a tuning frequency, whether to tune storage locations;
selecting, in response to deciding to tune storage locations, an inventory holder from the second group; and
selecting, in response to deciding not to tune storage locations, an inventory holder from the first group.

21. The method of claim 18, wherein determining a tuning differential comprises determining the tuning differential for each inventory holder within the first group based, at least in part, on a holder velocity of the inventory holder and a range of holder velocities associated with the storage region in which the inventory holder is located, wherein the holder velocity comprises a frequency with which one or more inventory items stored in the inventory holder are requested in retrieval requests.

22. The method of claim 1, wherein selecting the mobile drive unit comprises selecting the mobile drive unit based, at least in part, on one of:
 a distance between the selected mobile drive unit and the selected inventory station; and
 a distance between the selected mobile drive unit and the selected inventory holder.

23. A system for storing inventory items, comprising:
 a plurality of inventory holders operable to store inventory items;
 a plurality of mobile drive units operable to move inventory holders;
 a plurality of inventory stations where inventory items may be removed from inventory holders; and
 a management module operable to:
  receive a retrieval request that identifies an inventory item;
  select, from the plurality of inventory stations, an inventory station to fulfill an order associated with the retrieval request;
  select an inventory holder from the plurality of inventory holders that store the inventory item; and
  select, from the plurality of mobile drive units, a mobile drive unit to move the selected inventory holder to the selected inventory station.

24. The system of claim 23, wherein the management module is further operable to transmit information identifying the selected inventory station and the selected inventory holder to the selected mobile drive unit.

25. The system of claim 23, wherein the management module is further operable to transmit information identifying a position of the selected inventory station and a position of the selected inventory holder to the selected mobile drive unit.

26. The system of claim 23, wherein the management module is further operable to:
 move the selected mobile drive unit to the selected inventory holder;
 couple the selected mobile drive unit to the selected inventory holder; and
 move the selected mobile drive unit and the selected inventory holder to the selected inventory station.

27. The system of claim 23, wherein the management module is further operable to select the inventory station by selecting the inventory station based, at least in part, on one of:
 one or more distances between the selected inventory station and one or more inventory holders;
 one or more distances between the selected inventory station and one or more mobile drive units;
 an amount of work performed at the selected inventory station over a predetermined period of time; and
 contents of a queue associated with the selected inventory station.

28. The system of claim 23, wherein the management module is further operable to select the inventory holder by selecting the inventory holder based, at least in part, on one or more of:
 a quantity of the inventory item currently stored on the selected inventory holder; and
 a quantity of the inventory item currently stored on a particular face of the selected inventory holder.

29. The system of claim 23, wherein the management module is further operable to select the inventory holder by selecting the inventory holder based, at least in part, on one or more distances between the selected inventory holder and all active inventory stations.

30. The system of claim 23, wherein the management module is further operable to select the inventory holder by selecting the inventory holder based, at least in part, on one or more distances between the selected inventory holder and all active inventory stations that are currently configured to process retrieval requests.

31. The system of claim 23, wherein the management module is further operable to select the inventory holder by selecting the inventory holder based, at least in part, one or more distances between the selected inventory holder and one or more mobile drive units.

32. The system of claim 23, wherein the retrieval request identifies a plurality of inventory items and wherein the management module is further operable to select the inventory holder by selecting the inventory holder based, at least in part, on a quantity of inventory items that are both identified in the retrieval request and currently stored in the inventory holder.

33. The system of claim 23, wherein the management module is further operable to select the inventory holder by selecting the inventory holder based, at least in part, on whether the inventory holder is located in a storage region associated with that inventory holder.

34. The system of claim 23, wherein the management module is further operable to select the inventory holder by selecting the inventory holder based, at least in part, on whether the selected inventory holder will have an additional empty bin as a result of being used to fulfill the retrieval request.

35. The system of claim 23, wherein the management module is further operable to selecting the mobile drive unit comprises selecting the mobile drive unit based, at least in part, on one of:
 a distance between the selected mobile drive unit and the selected inventory station; and
 a distance between the selected mobile drive unit and the selected inventory holder.

36. A computer program stored on a computer-readable medium, the computer program operable to:
 receive a retrieval request that identifies an inventory item;
 select, from the plurality of inventory stations, an inventory station to fulfill an order associated with the retrieval request;
 select an inventory holder from the plurality of inventory holders that store the inventory item; and
 select, from the plurality of mobile drive units, a mobile drive unit to move the selected inventory holder to the selected inventory station.

37. The computer program of claim 36, wherein the computer program is further operable to transmit information identifying the selected inventory station and the selected inventory holder to the selected mobile drive unit.

38. The computer program of claim 36, wherein the computer program is further operable to transmit information identifying a position of the selected inventory station and a position of the selected inventory holder to the selected mobile drive unit.

39. The computer program of claim 36, wherein the computer program is further operable to:

move the selected mobile drive unit to the selected inventory holder;

couple the selected mobile drive unit to the selected inventory holder; and move the selected mobile drive unit and the selected inventory holder to the selected inventory station.

40. The computer program of claim 36, wherein the computer program is further operable to select the inventory station by selecting the inventory station based, at least in part, on one of:

one or more distances between the selected inventory station and one or more inventory holders;

one or more distances between the selected inventory station and one or more mobile drive units;

an amount of work performed at the selected inventory station over a predetermined period of time; and contents of a queue associated with the selected inventory station.

41. The computer program of claim 36, wherein the computer program is further operable to select the inventory holder by selecting the inventory holder based, at least in part, on one or more of:

a quantity of the inventory item currently stored on the selected inventory holder; and a quantity of the inventory item currently stored on a particular face of the selected inventory holder.

42. The computer program of claim 36, wherein the computer program is further operable to select the inventory holder by selecting the inventory holder based, at least in part, on one or more distances between the selected inventory holder and all active inventory stations.

43. The computer program of claim 36, wherein the computer program is further operable to select the inventory holder by selecting the inventory holder based, at least in part, on one or more distances between the selected inventory holder and all active inventory stations that are currently configured to process retrieval requests.

44. The computer program of claim 36, wherein the computer program is further operable to select the inventory holder by selecting the inventory holder based, at least in part, on one or more distances between the selected inventory holder and one or more mobile drive units.

45. The computer program of claim 36, wherein the retrieval request identifies a plurality of inventory items and wherein the computer program is further operable to select the inventory holder by selecting the inventory holder based, at least in part, on a quantity of inventory items that are both identified in the retrieval request and currently stored in the inventory holder.

46. The computer program of claim 36, wherein the computer program is further operable to select the inventory holder by selecting the inventory holder based, at least in part, on whether the inventory holder is located in a storage region associated with that inventory holder.

47. The computer program of claim 36, wherein the computer program is further operable to select the inventory holder by selecting the inventory holder based, at least in part, on whether the selected inventory holder will have an additional empty bin as a result of being used to fulfill the retrieval request.

48. The computer program of claim 36, wherein the computer program is further operable to selecting the mobile drive unit comprises selecting the mobile drive unit based, at least in part, on one of:

a distance between the selected mobile drive unit and the selected inventory station; and a distance between the selected mobile drive unit and the selected inventory holder.

49. A system for retrieving inventory items within an inventory system, comprising:

means for receiving a retrieval request that identifies an inventory item;

means for selecting, from a plurality of inventory stations, an inventory station to fulfill an order associated with the retrieval request;

means for selecting an inventory holder from a plurality of inventory holders that store the inventory item; and means for selecting, from a plurality of mobile drive units, a mobile drive unit to move the selected inventory holder to the selected inventory station.

* * * * *